United States Patent
Hawkins et al.

(10) Patent No.: US 9,701,067 B2
(45) Date of Patent: Jul. 11, 2017

(54) METHOD OF LAYING UP PREPREG PLIES ON CONTOURED TOOLS USING A DEFORMABLE CARRIER FILM

(71) Applicant: The Boeing Company, Chicago, IL (US)

(72) Inventors: Robert D. Hawkins, Bonney Lake, WA (US); Kurtis S. Willden, Kent, WA (US); Andrew E. Modin, Daniel Island, SC (US); Edoardo Depase, Manhattan Beach, CA (US); Michael L. Glain, Seattle, WA (US); Benjamin Adam Mussi, Bellevue, WA (US); Max U. Kismarton, Renton, WA (US)

(73) Assignee: THE BOEING COMPANY, Chicago, IL (US)

(*) Notice: Subject to any disclaimer, the term of this patent is extended or adjusted under 35 U.S.C. 154(b) by 638 days.

(21) Appl. No.: 14/048,009

(22) Filed: Oct. 7, 2013

(65) Prior Publication Data
US 2014/0027048 A1    Jan. 30, 2014

Related U.S. Application Data

(63) Continuation-in-part of application No. 12/945,024, filed on Nov. 12, 2010, now Pat. No. 8,551,380, and
(Continued)

(51) Int. Cl.
*B29C 70/20* (2006.01)
*B29C 70/02* (2006.01)
(Continued)

(52) U.S. Cl.
CPC ............ *B29C 70/021* (2013.01); *B29C 70/20* (2013.01); *B29C 70/30* (2013.01); *B29C 70/541* (2013.01)

(58) Field of Classification Search
None
See application file for complete search history.

(56) References Cited

U.S. PATENT DOCUMENTS

| | | | |
|---|---|---|---|
| 3,598,006 A | 8/1971 | Gerber et al. | |
| 3,983,282 A | 9/1976 | Seemann, III | |

(Continued)

FOREIGN PATENT DOCUMENTS

| | | |
|---|---|---|
| CN | 102555229 A | 7/2012 |
| EP | 0271263 A2 | 6/1988 |

(Continued)

OTHER PUBLICATIONS

Sieberg et al., "An advanced FRP manufacturing technique asserts itself: Practical experience with the vacuum injection process," Studiedag Vakuuminjecteren, XP002169062, Oct. 27, 1998, pp. 13-19. (English translation and original German-language article).
(Continued)

*Primary Examiner* — Edmund Lee
(74) *Attorney, Agent, or Firm* — Yee & Associates, P.C.

(57) ABSTRACT

A method is presented. The method comprises identifying a desired shape of a ply on a tool, in which the ply has a fiber orientation; identifying a cut shape for the ply, in which the cut shape is different than the desired shape; cutting a composite prepreg ply to have the cut shape, the composite prepreg ply having the fiber orientation; using a deformable carrier to apply the composite prepreg ply having the cut shape to the tool such that the composite prepreg ply has the desired shape on the tool.

17 Claims, 16 Drawing Sheets

Related U.S. Application Data a continuation-in-part of application No. 13/736,021, filed on Jan. 7, 2013, now Pat. No. 9,387,657.

(51) Int. Cl.
    *B29C 70/54*      (2006.01)
    *B29C 70/30*      (2006.01)

(56) References Cited

U.S. PATENT DOCUMENTS

| | | | |
|---|---|---|---|
| 4,016,022 | A | 4/1977 | Browning et al. |
| 4,120,632 | A | 10/1978 | Stoeberl |
| 4,132,755 | A | 1/1979 | Johnson |
| 4,180,608 | A | 12/1979 | Del |
| 4,622,091 | A | 11/1986 | Letterman |
| 4,726,924 | A | 2/1988 | Mittelstadt |
| 4,902,215 | A | 2/1990 | Seemann, III |
| 4,942,013 | A | 7/1990 | Palmer et al. |
| 4,961,700 | A | 10/1990 | Dunbar |
| 5,052,906 | A | 10/1991 | Seemann |
| 5,116,216 | A | 5/1992 | Cochran et al. |
| 5,123,985 | A | 6/1992 | Evans et al. |
| 5,129,813 | A | 7/1992 | Shepherd |
| 5,316,462 | A | 5/1994 | Seemann |
| 5,364,584 | A | 11/1994 | Imanara et al. |
| 5,427,725 | A | 6/1995 | White et al. |
| 5,439,635 | A | 8/1995 | Seemann |
| 5,441,692 | A | 8/1995 | Taricco |
| 5,576,030 | A | 11/1996 | Hooper |
| 5,601,852 | A | 2/1997 | Seemann |
| 5,702,663 | A | 12/1997 | Seemann |
| 5,721,034 | A | 2/1998 | Seemann, III et al. |
| 5,904,972 | A | 5/1999 | Tunis, III et al. |
| 5,939,013 | A | 8/1999 | Han et al. |
| 5,958,325 | A | 9/1999 | Seemann, III et al. |
| 6,090,335 | A | 7/2000 | McClure et al. |
| 6,299,819 | B1 | 10/2001 | Han |
| 6,391,436 | B1 | 5/2002 | Xu et al. |
| 6,406,659 | B1 | 6/2002 | Lang et al. |
| 7,186,361 | B2 | 3/2007 | Kasai et al. |
| 7,469,735 | B2 | 12/2008 | Brown et al. |
| 7,544,261 | B1 | 6/2009 | Nogueroles Vines et al. |
| 7,603,017 | B2 | 10/2009 | Cianciotto et al. |
| 7,670,525 | B2 | 3/2010 | Weidmann et al. |
| 7,871,553 | B2 | 1/2011 | Wilkerson et al. |
| 7,943,076 | B1 | 5/2011 | Hawkins et al. |
| 7,975,549 | B2 | 7/2011 | Fetzer et al. |
| 7,993,480 | B2 | 8/2011 | Anderson et al. |
| 8,066,929 | B2 | 11/2011 | Eberth et al. |
| 8,333,858 | B2 | 12/2012 | Rubin et al. |
| 8,349,105 | B2 | 1/2013 | Kehrl et al. |
| 8,551,380 | B2 | 10/2013 | Hawkins et al. |
| 2006/0059848 | A1 | 3/2006 | MacDonald-Schmidt et al. |
| 2006/0216480 | A1 | 9/2006 | Weidmann et al. |
| 2006/0249868 | A1 | 11/2006 | Brown et al. |
| 2007/0161483 | A1 | 7/2007 | Raf |
| 2007/0175572 | A1 | 8/2007 | Rubin et al. |
| 2007/0175575 | A1 | 8/2007 | Rubin et al. |
| 2008/0053599 | A1 | 3/2008 | Aijima |
| 2009/0008825 | A1 | 1/2009 | Eberth et al. |
| 2009/0148647 | A1 | 6/2009 | Jones et al. |
| 2009/0239018 | A1 | 9/2009 | Aijima |
| 2009/0261199 | A1 | 10/2009 | McCarville et al. |
| 2009/0263618 | A1 | 10/2009 | McCarville et al. |
| 2010/0080942 | A1 | 4/2010 | McCarville et al. |
| 2010/0136293 | A1 | 6/2010 | Kubryk et al. |
| 2011/0097554 | A1 | 4/2011 | Kehrl et al. |
| 2011/0192541 | A1 | 8/2011 | Anderson et al. |
| 2012/0076973 | A1 | 3/2012 | Guzman et al. |
| 2012/0098155 | A1 | 4/2012 | Kubryk et al. |
| 2012/0121866 | A1 | 5/2012 | Hawkins et al. |
| 2013/0084434 | A1 | 4/2013 | Kehrl et al. |
| 2014/0065354 | A1 | 3/2014 | Smith et al. |

FOREIGN PATENT DOCUMENTS

| | | |
|---|---|---|
| EP | 0348831 A2 | 1/1990 |
| EP | 0816438 A2 | 1/1998 |
| EP | 0990507 A2 | 4/2000 |
| EP | 1038656 A1 | 9/2000 |
| EP | 1894706 A1 | 3/2008 |
| EP | 2452806 A2 | 5/2012 |
| GB | 2467417 A | 8/2010 |
| JP | S61202823 A | 9/1986 |
| JP | 2012101538 A | 5/2012 |
| PT | 2452806 E | 10/2014 |
| WO | 2009020971 A2 | 2/2009 |
| WO | WO2009112694 A2 | 9/2009 |
| WO | WO2014107241 A1 | 7/2014 |

OTHER PUBLICATIONS

International Search Report and Written Opinion, dated Mar. 10, 2015, regarding Application No. PCT/US2014/052457, 19 pages.
Notice of Allowance, dated Mar. 10, 2016, regarding U.S. Appl. No. 13/736,021, 7 pages.
International Search Report and Written Opinion, dated Apr. 3, 2013, regarding Application No. PCT/US2013/070918, 12 pages.
International Preliminary Report on Patentability, dated Jul. 7, 2015, regarding Application No. PCT/US2013/070918, 7 pages.
European Search Report, dated Aug. 17, 2012, regarding Application No. EP11187925 (EP2452806), 11 pages.
Brittles, "New Developments in Resin Transfer Moulding," Proc. 19th International Composites Congress, Nov. 1994, pp. 11-26.
Buckingham et al., "Automating the Manufacture of Composite Broadgoods," Composites, IPC Business Press Ltd., Haywards Heath, GB, vol. 27A, No. 3, Mar. 1996, pp. 191-200.
Hohfeld et al., "Consolidation of thick, close, circular knitted glass fiber textiles with epoxy resin into flat panels, tubes, and T-profiles," 3rd International Conference of Flow Processes in Composite Materials, Jul. 1994, pp. 120-142.
Smith, Jr., et al., "Method of Fabricating a Curved Composite Structure Using Composite Prepreg Tape," U.S. Appl. No. 13/736,021, filed Jan. 7, 2013, 42 pages.
Williams et al., "Resin Infusion under Flexible Tooling (RIFT): A Review," Composites Part A: Applied Science and Manufacturing, vol. 27, No. 7, 1996, pp. 517-524.
Office Action, dated Nov. 2, 2012, regarding U.S. Appl. No. 12/945,024, 15 pages.
Notice of Allowance, dated Jun. 5, 2013, regarding U.S. Appl. No. 12/945,024, 15 pages.
Office Action, dated Nov. 20, 2015, regarding U.S. Appl. No. 13/736,021, 41 pages.

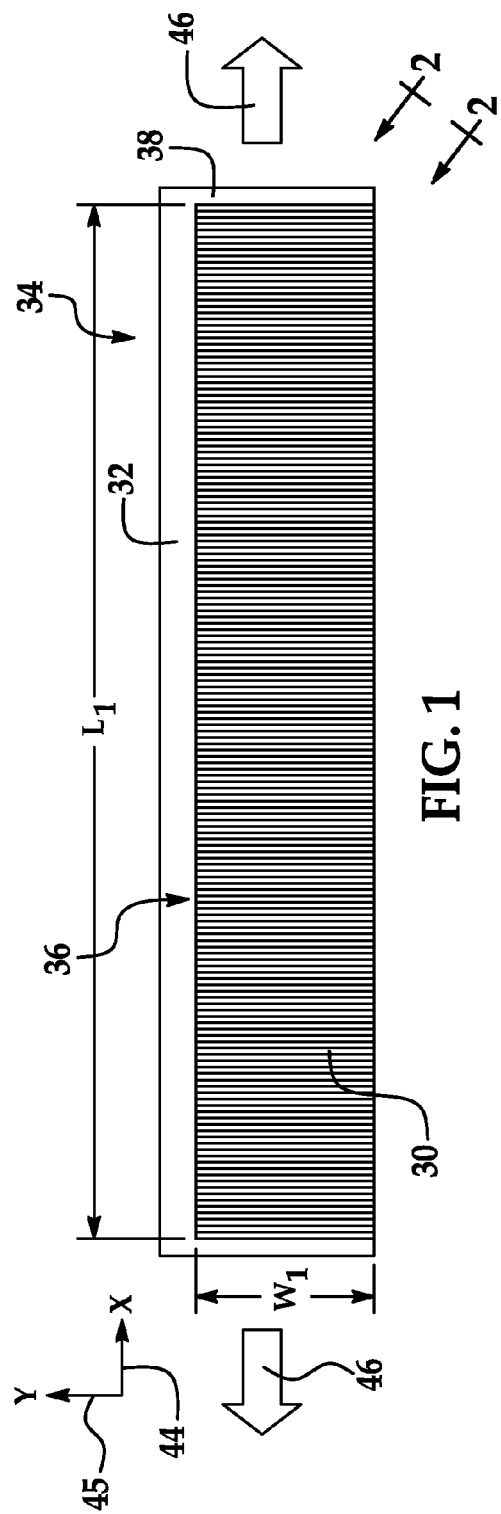
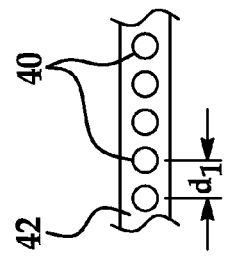
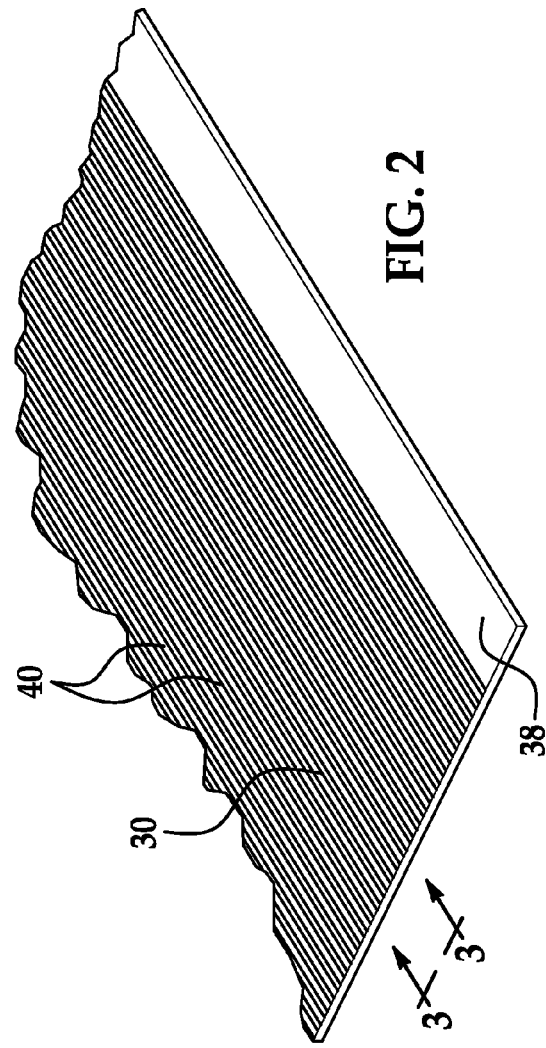

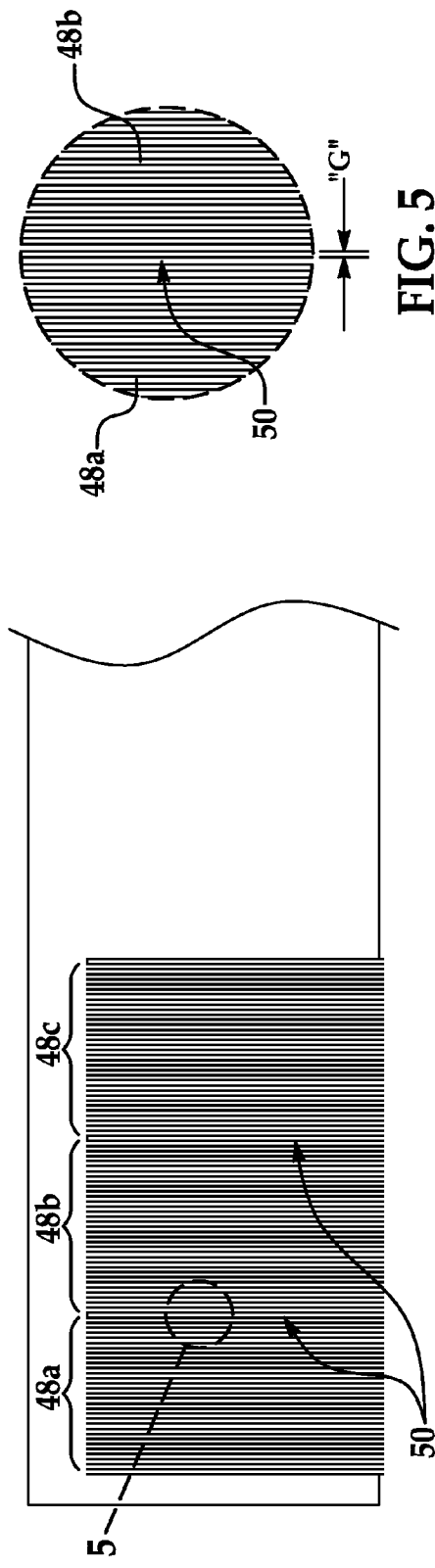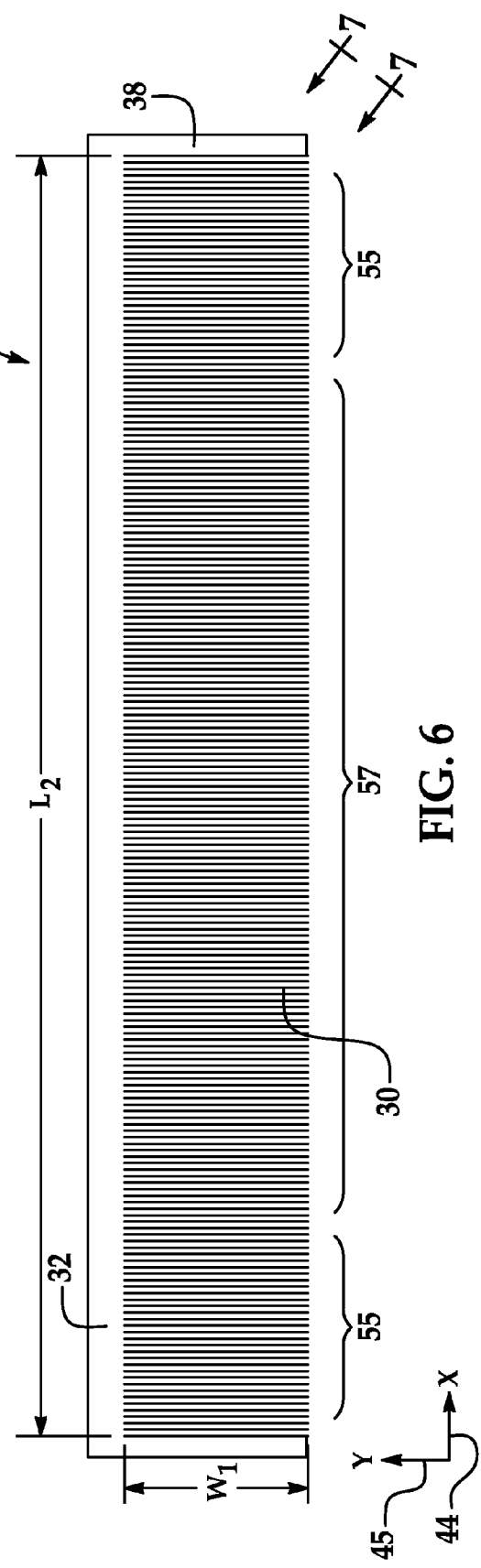

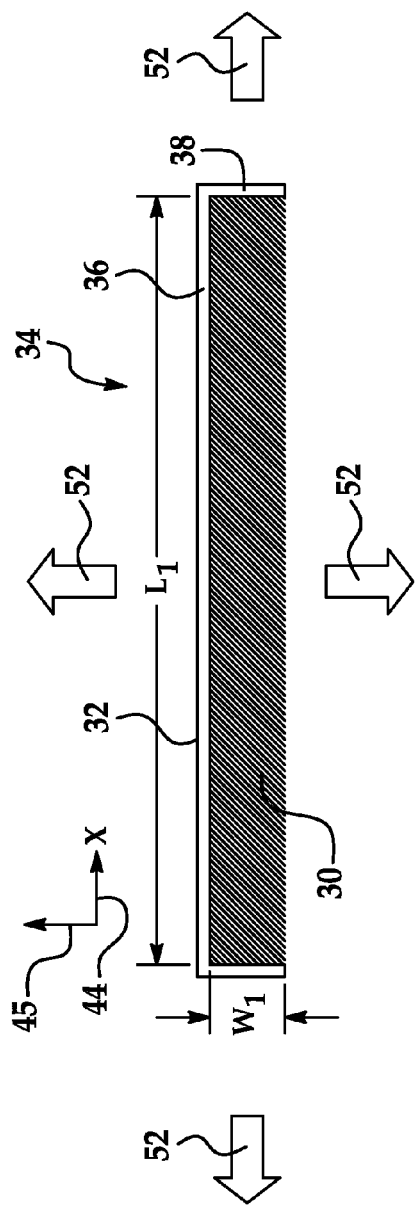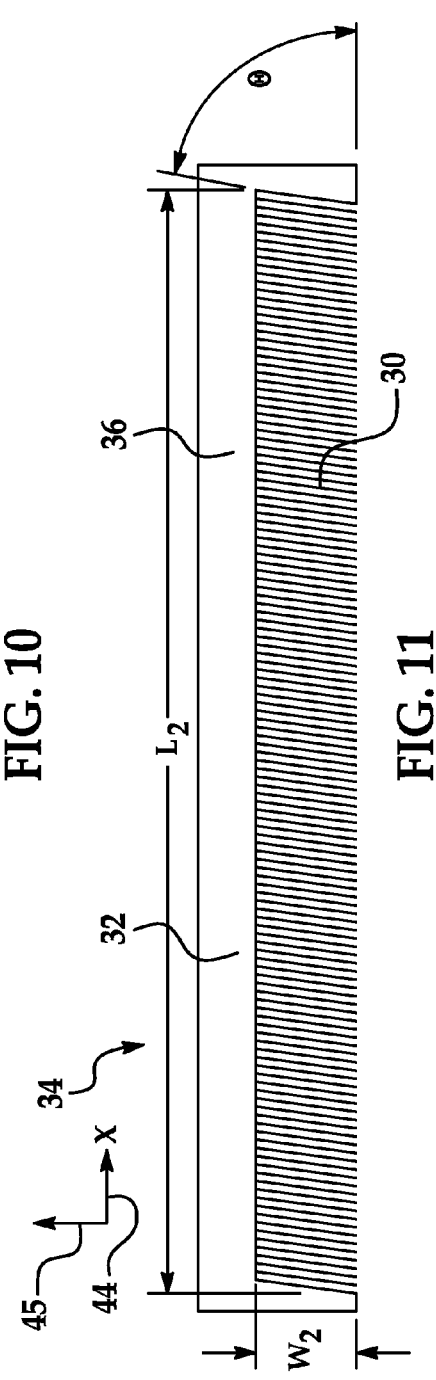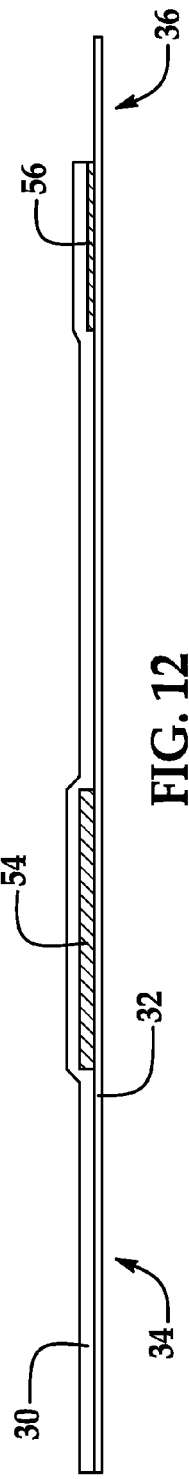
FIG. 10
FIG. 11
FIG. 12

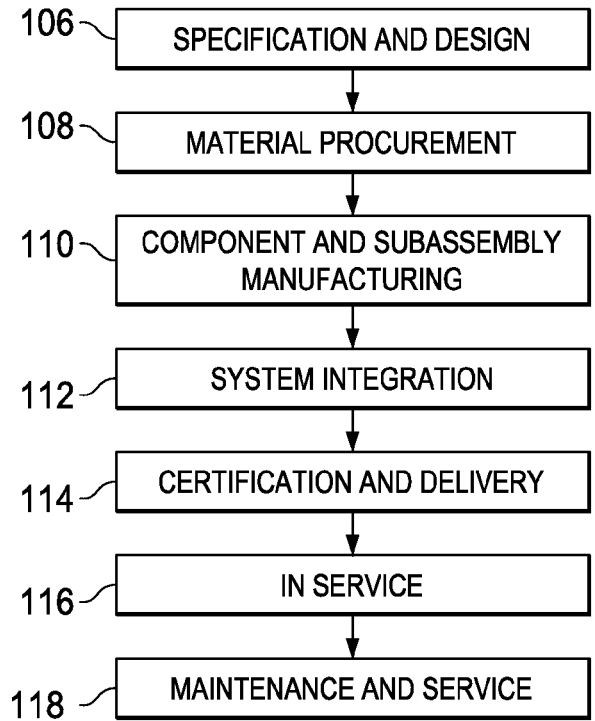
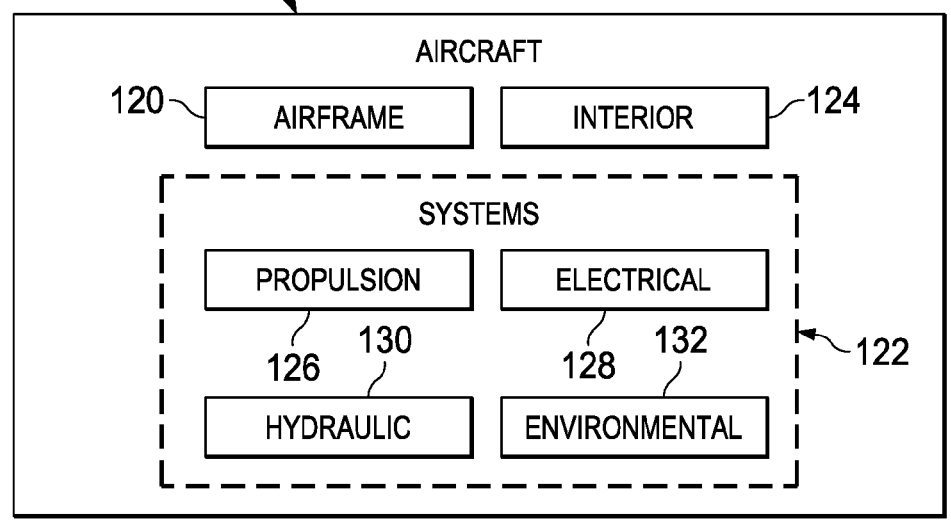

METHOD OF LAYING UP PREPREG PLIES ON CONTOURED TOOLS USING A DEFORMABLE CARRIER FILM

CROSS REFERENCE TO RELATED APPLICATIONS

This application is a continuation-in-part of U.S. patent application Ser. No. 12/945,024 filed Nov. 12, 2010, now U.S. Pat. No. 8,551,380, the entire disclosure of which is incorporated by reference herein. This application is a continuation-in-part of U.S. patent application Ser. No. 13/736,021 filed Jan. 7, 2013, now U.S. Pat. No. 9,387,657, the entire disclosure of which is incorporated by reference herein.

BACKGROUND INFORMATION

1. Field

This disclosure generally relates to processes for fabricating curved composite structures, and deals more particularly with a method of handling and laying up composite plies, especially on contoured tools.

2. Background

During layup of prepreg plies over a tool, it is sometimes necessary to closely conform the plies to curves, contours and/or features of the tool in order to assure that the fibers follow the load path and the layup is dimensionally accurate and substantially free of voids, wrinkling and/or buckling. Known techniques for conforming plies to curved tool surfaces involve darting, cutting and/or splitting the ply during the layup process, and/or extensive hand sweeping to conform a ply to contoured tool surfaces. These techniques may be time consuming. These techniques may not result in a cured part having a desired mechanical strength. Another solution to the problem involves incrementally steering relatively narrow slit prepreg tape onto a contoured tool in order to form curved plies. However, the use of slit tape may increase material costs and reduce production rates since laying down slit tape may be more time consuming.

SUMMARY

In one illustrative embodiment, a method is presented. The method comprises identifying a desired shape of a ply on a tool, in which the ply has a fiber orientation; identifying a cut shape for the ply, in which the cut shape is different than the desired shape; cutting a composite prepreg ply to have the cut shape, the composite prepreg ply having the fiber orientation; and using a deformable carrier to apply the composite prepreg ply having the cut shape to the tool such that the composite prepreg ply has the desired shape on the tool.

Another illustrative embodiment of the present disclosure presents a method. The method comprises identifying a desired shape of a ply on a tool, in which the ply has a fiber orientation; identifying a cut shape for the ply, in which the cut shape is different than the desired shape; cutting a composite prepreg ply to have the cut shape, the composite prepreg ply having the fiber orientation; placing the composite prepreg ply on a carrier; and using the carrier to apply the composite prepreg ply to the tool, including deforming the composite prepreg ply by stretching the carrier, stretching comprising changing one of a length or a width of the carrier.

In yet another illustrative embodiment, a method is presented. The method comprises providing a deformable carrier film; reinforcing a portion of the carrier film against stretching, including impregnating the portion with reinforcing fibers; placing a composite doubler on the carrier; and using the carrier to apply the composite doubler to the tool.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is an illustration of a plan view of a composite prepreg ply held on a deformable carrier film, prior to deforming.

FIG. 2 is an illustration of a perspective view of a corner of the carrier film viewed from the direction shown as '2' in FIG. 1.

FIG. 3 is an illustration of a view of the ply in direction shown as '3' in FIG. 2.

FIG. 4 is an illustration of a plan view of the carrier film showing several courses of composite material having been applied to the film.

FIG. 5 is an illustration of the area designated as '5' in FIG. 4.

FIG. 6 is an illustration similar to FIG. 1 but showing the carrier film and the ply having been deformed.

FIG. 10 is an illustration of a plan view of a carrier film having a 45 degree ply compacted thereon, prior to deforming.

FIG. 11 is an illustration similar to FIG. 10 but showing the carrier film and ply having been deformed in orthogonal directions.

FIG. 12 is an illustration of a sectional view of a carrier film having a ply, a ply doubler and a release film strip applied thereto.

FIG. 39 is an illustration of a flow diagram of aircraft production and service methodology.

FIG. 40 is an illustration of a block diagram of an aircraft.

DETAILED DESCRIPTION

Figure 8:
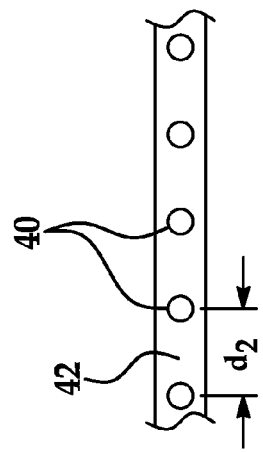
FIG. 8 is an illustration of a sectional view of the deformed ply viewed in the direction shown as '8' in FIG. 7.

The illustrative embodiments recognize and take into account it may be desirable to provide a method of laying up a composite ply over a contoured tool that allows the ply to be deformed as it is applied to the tool in order to more closely conform the ply to tool contours while the ply remains accurately positioned. The illustrative embodiments also recognize and take into account laying up a composite ply may include forming curved composite plies, especially 0 degree plies, using substantially straight unidirectional prepreg tape. The illustrative embodiments also recognize that laying up and forming curved zero degree plies may reduce or eliminate the use of incrementally steering individual strips of slit tape around a curved tool.

The illustrative embodiments further recognize and take into account that it may be desirable to provide a method of handling and transporting ply material which allows the material to remain stable during transport and layup. The disclosed embodiments provide a method of supporting, positioning and deforming a prepreg ply while it is being conformed to complex shapes, contours and features of a tool. The prepreg ply may be formed of straight, unidirectional prepreg tape. Straight lengths of unidirectional prepreg tape may be used to form structures having compound curves. The method may utilize a deformable carrier film to support the ply during the layup process in order to prevent the plies from wrinkling and/or buckling as they are being laid up. Use of the carrier film allows the prepreg ply to be accurately positioned and uniformly deformed as needed to conform to contoured tool surfaces. The carrier film may also be used to stabilize the composite ply during handling and transporting. The method may eliminate the use of narrow slit tape, as well as extensive hand working, darting, cutting, and splitting during ply layup. Reducing the use of narrow slit tape may also reduce the use of relatively expensive automated slit tape placement equipment to incrementally lay up zero degree plies. Further, the method may reduce the time required for laying up and forming complex contoured structures by using full width composite prepreg tape. The method may also increase laydown rates of composite material and may facilitate automation of the layup process. Further, the method may improve the accuracy of ply boundaries and provide more uniform deforming of ply material when required, resulting in improvements in both the strength and appearance of cured composite parts.

Referring first to FIGS. 1, 2 and 3, a ply 30 of composite resin material is held in face-to-face contact on a carrier film 32 to form a ply carrier assembly 34. The carrier film 32 may be used to transport the ply 30 and/or to apply the ply 30 to a tool (not shown) during a layup process for producing a composite part layup (not shown). In the example illustrated in FIGS. 1-3, the ply 30 may be a prepreg that includes unidirectional reinforcing fibers 40 having a zero degree orientation, however other plies (not shown) in the part layup may have other fiber orientations based on a predefined ply schedule.

The fibers 40 are pre-impregnated with a suitable polymer resin 42 which acts as a matrix to hold the fibers 40 in the desired orientation following curing. The composite ply 30 has a length $L_1$ and a width $W_1$ prior to being deformed during the layup process, as will be described in more detail below. The ply 30 is adhered to the carrier film 32 by the tackiness of the uncured resin 42 in the ply 30, however additional tackifiers may be used to provide the necessary adherence between the ply 30 and the carrier film 32. Following placement of the ply 30 on the carrier film 32, the ply 30 may be compacted against the carrier film 32 to assure that the ply is substantially free of buckling, wrinkles or other irregularities.

The ply 30 may be placed on the carrier film 32 so as to leave one or more edge margins 36, 38 on the film 32 around the ply 30 to facilitate handling of the film 32 and/or attachment of hardware or equipment (not shown) to the film 32 that may be used to deform, manipulate and/or hold the carrier film 32 during the layup process. As will be discussed below, once compacted on the carrier film 32, the ply carrier assembly 34 can be deformed to fit different contours and shapes of a tool (not shown). The carrier film 32 allows for controlled and uniform or non-uniform deforming of the resin 42, and may also be used only as a carrier for transporting the prepreg ply 30 from an offline layup station (not shown) to the layup tool (not shown). As used herein, "deform" and "deforming" refer to stretching and/or shearing of a ply material in one or more directions, including simple and compound curves, and within one or more planes.

The carrier film 32 may be deformed in at least one direction, which in the illustrated example, is along an X axis 44, transverse to the orientation of the fibers 40. The carrier film 32 may comprise, for example and without limitation, a latex rubber or similar natural or synthetic deformable material having a thickness suitable for the application. The carrier film 32 material may be an elastic material that returns substantially to its original size and shape following deforming. During the layup process, the ply 30 may be deformed by grasping the film at the opposite edge margins 38 and pulling film 32 in opposite directions indicated by the arrows 46, substantially along the X axis 44.

Prior to the ply 30 being deformed, the fibers 40 may have an inter-spacing $d_1$. The visco-elastic resin 42 (FIG. 3) yields when deformed in a direction perpendicular to the fiber direction (in this case, the Y axis 45), thereby allowing the fibers 40 to slip or shear substantially simultaneously in a direction parallel to the fiber direction, i.e. along the X axis 44, which permits the prepreg ply 30 to conform to the contours of a layup tool (not shown).

Referring to FIGS. 4 and 5, the ply 30 may be applied to the carrier film 32 by placing a plurality of individual courses 48a, 48b, 48c of unidirectional split tape or tows on the film 32, in side-by-side, substantially parallel and abutting relationship either by hand or by using automated fiber placement equipment (not shown). Depending on the application and the particular materials being used, the edges 50 of the courses may overlap slightly or may form gaps G between the courses 48. Deforming of the carrier film 32 may be used to control the size of the overlap or gap G between the courses 48 during layup of the ply 30 on a tool (not shown). Furthermore, the carrier film 32 may be used to change the grade of a prepreg material used to form the ply 30. For example, the grade (areal weight) of a prepreg material may be changed by uniformly deforming the material to a desired grade. Changing the grade of a prepreg material in this manner using the carrier film 32 may be useful in producing interleafed doublers that may reduce part weight, and/or material costs.

Figure 7:
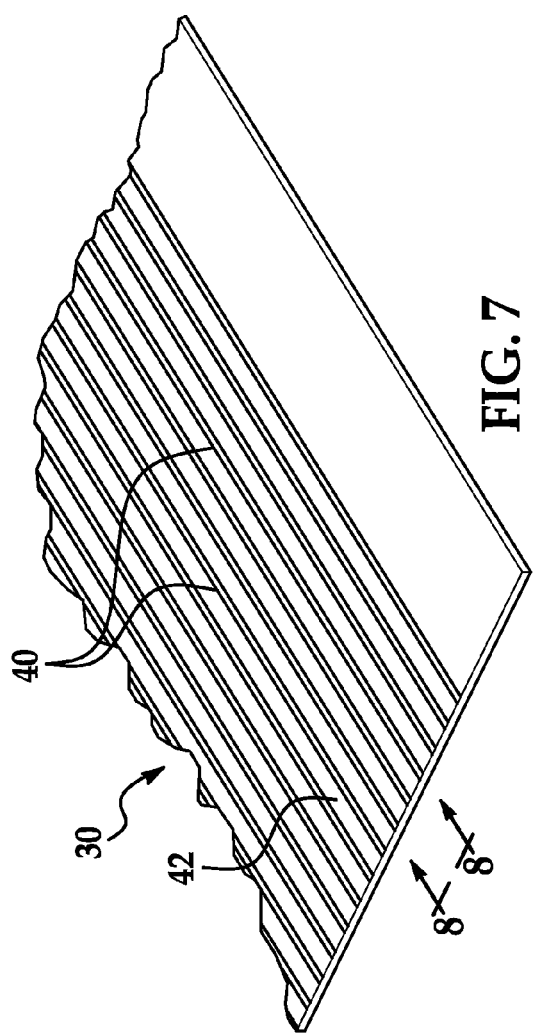
FIG. 7 is an illustration similar to FIG. 2 showing a corner of the ply and the carrier film after deforming.

FIGS. 6, 7 and 8 illustrate the ply 30 following deforming along the X axis 44 in the direction of the arrows 46 in FIG. 1. From FIG. 6 it can be seen that while the width $W_1$ of the ply 30 remains substantially the same, the ply 30 has been deformed to a greater length $L_2$ as a result of the deforming of the carrier film 32. Deforming of the carrier film 32 effectively deforms the resin 42 in the ply 30 which results in an increase in the spacing between the reinforcing fibers to a dimension $d_2$ which is greater than $d_1$. Deforming the ply 30 in this manner may allow the ply 30 to better conform to contours and other features of a tool surface (not shown) during the layup process, and may stabilize the ply material during layup. The carrier film 32 may prevent the prepreg ply 30 from splitting, wrinkling and/or buckling as it is being formed over a tool (not shown), and may allow the ply 30 to be precisely positioned on the tool during the layup process. It should be noted here that generally, when deforming a 90 degree ply 30 as described above in connection with FIGS. 1-8, the fibers 40 may be expected to deform substantially uniformly along the X axis 44. However, when deforming non-90 degree plies 30, the fiber deformation may not be uniform. For example, when deforming a 0 degree ply 30 (not shown) in the direction of the X axis 44, the fibers 40 near the ends 55 (FIG. 6) of the ply 30 may shear at an angle (not shown) relative to the fibers 40 near the center 57 of the ply 30 which retain their 0 degree orientation. This shearing effect may occur gradually, growing increasingly from the center 57 toward the ends 55. Compensation for this shearing deformation may be achieved by cutting the ends 55 of the ply 30 at a preselected angle (not shown). When deforming a 45 degree ply 30, both shearing and stretching of the fibers 40 may occur.

Figure 9:
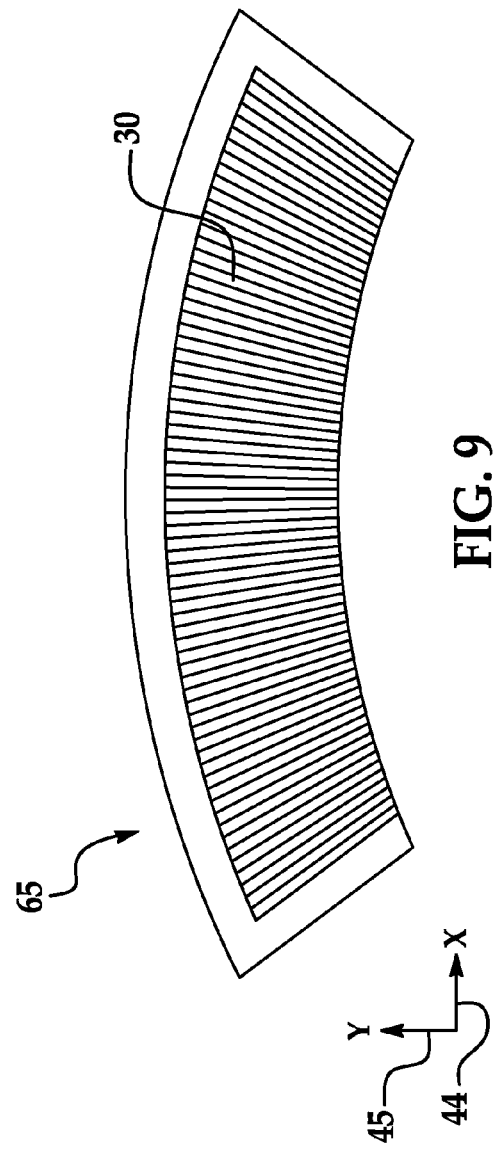
FIG. 9 is an illustration of a plan view of a 90 degree ply on a carrier film that has been deformed to stretch the ply into a fan shaped pattern.

FIG. 9 illustrates the use of the carrier film 32 to deform a 90 degree ply 30 into a radial or fan-like pattern 65 within a single plane, wherein the fiber directions are shown in solid lines. Although not shown in the Figure, this same radial pattern 65 may be deformed into other planes.

FIGS. 10 and 11 illustrate a prepreg ply 30 having a 45 degree fiber orientation which has a width $W_1$ and a length $L_1$ prior to deforming as shown in FIG. 9. In this example, appropriate tension 52 applied to the carrier film 32 causes the film 32 to deform along orthogonal X and Y axes 44, 45, and likewise deforms the ply 30 to both a greater length $L_2$ and a greater width $W_2$. Stretching of the film 32 along the Y axis 45 results in a change in the orientation angle of the fibers 40 to some angle θ less than 45 degrees. Although the ply examples shown in FIGS. 1-10 are shown being deformed along single axis or two orthogonal axes 44, 45, the ply 30 may be deformed in other directions and within other planes, depending on the requirements of the application and the geometry of the tool (not shown) to which the ply 30 must be conformed, as well as how tension 52 is applied to the carrier film 32. Moreover, as will be discussed below, it may be possible to deform only one or more portions of the carrier film 32 so that only corresponding portions (not shown) of the ply 30 are deformed during the layup process.

In some applications, it may be possible to use the carrier film 32 to pre-position and place additional items of a layup assembly on a tool (not shown), such as without limitation, doublers, release films, and caul plates, along with the ply 30. For example, FIG. 12 illustrates a ply 30 placed on a carrier film 32 in which a composite doubler 54 is sandwiched between the ply 30 and the carrier film 32. Similarly, a strip 56 of release film is sandwiched between the ply 30 and the carrier film 32 along the edge margin 36 on the film 32 which may aid in releasing and peeling the carrier film 32 away from the laid up ply 30. Thus, in this example, during the layup process, use of the carrier film 32 allows the ply 30, the doubler 54 and the release film strip 56 to be precisely positioned relative to each other, and to be laid up over a tool (not shown) in a single step.

Figure 13:
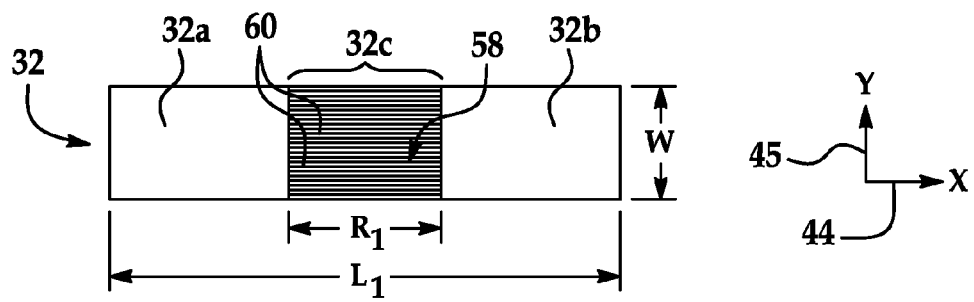
FIG. 13 is an illustration of a carrier film prior to deforming which includes a substantially non-deformable area containing a fiber reinforcement.

As previously mentioned, it may be possible or desirable in some applications to deform only a portion of the ply 30 during the layup process. Deforming of the carrier film 32 can be tailored to selectively constrain the elasticity of the ply carrier 32 using any of several techniques that suit part geometry and forming requirements. FIG. 13 illustrates a carrier film 32 having a section 32c that includes a reinforced portion 58 which resists deforming as the film 32 is being deformed during the layup process. In this example, the reinforcement of the film portion 32c is achieved by impregnating unidirectional fibers 60 into the carrier film 32, oriented in the direction that the film 32 is to be deformed, which in this example, is along the X axis 44.

Prior to deforming, carrier film has a length $L_1$ and the reinforced portion 32c has a width $R_1$ as shown in FIG. 13. When the carrier film 32 is deformed along the X axis 44, which corresponds to the axial direction of the fibers 60, the fibers 60 do not deform substantially, consequently the width $R_1$ of the reinforced section 32c remains the substantially same while the overall length of the carrier film 32 deforms to $L_2$ as a result of the non-reinforced sections 32a, 32b of the film 32 on each side of the reinforced section 32c being allowed to deform. It may also be possible to employ a reinforcement in the reinforced section 32c which allows some degree of deforming of the film 32, but less than other, non-reinforced areas of the film 32. The reinforced portion 32c may comprise, for example and without limitation, cross stitching (not shown) in the film 32. Depending on the type of reinforcement that is used, the width W of the reinforced portion 32c may or may not become more narrow when the film 32 is stretched.

Figure 14:
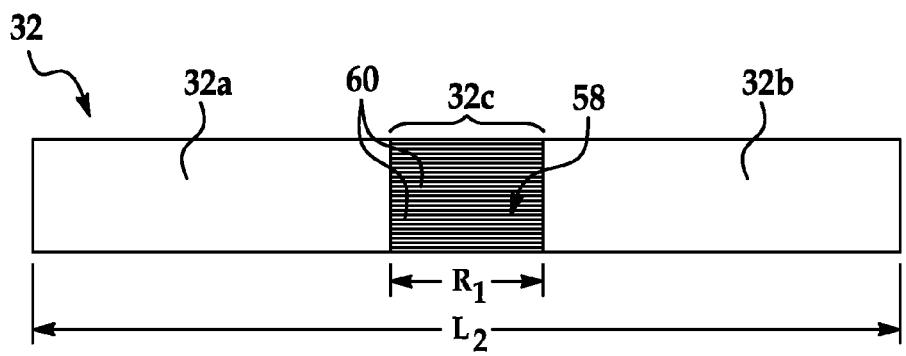
FIG. 14 is an illustration similar to FIG. 13 but showing portions of the carrier film having been deformed.
Figure 15:
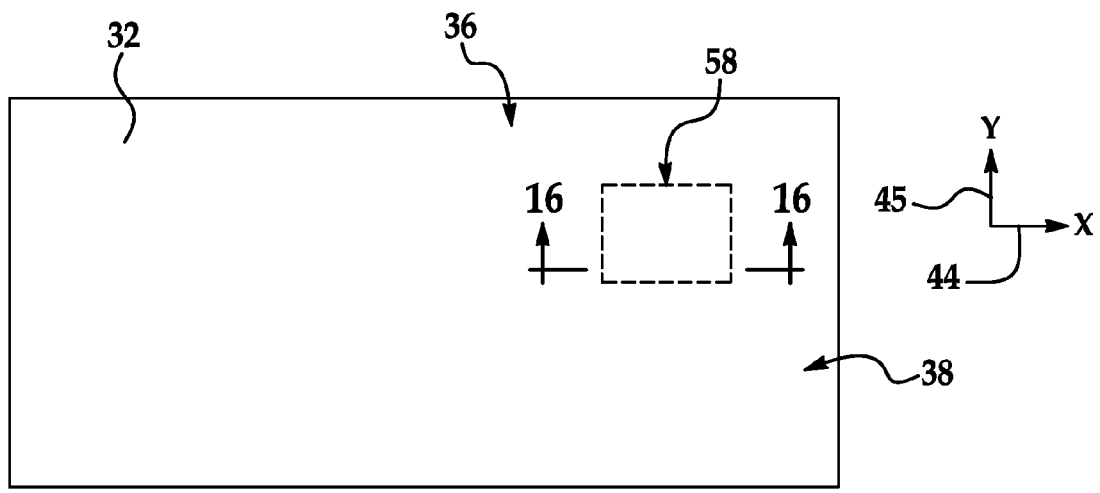
FIG. 15 is an illustration of a plan view of a carrier film having an isolated area of reinforcement therein.

In the case of the example shown in FIGS. 13 and 14, the reinforced area 58 is centrally located within the carrier film 32 and extends across its entire width W. FIG. 15 illustrates an example in which the reinforced area 58 is spaced inwardly from the edge margins 36, 38 of the carrier film 32 and is disposed off-center within the area of the film 32. As in the example shown in FIGS. 13 and 14, the reinforced area 58 shown in FIG. 15 also may incorporate reinforcing fibers 60 (see FIG. 14) into the carrier film 32 which may be unidirectional or multi-directional. For example, the fibers 60 may be woven together and incorporated into the film 32 in a manner that resists deforming in two orthogonal directions, e.g. along the X and Y axes 44, 45, that correspond to the orientations of the reinforcing fibers. Similarly, fibers 60 may be placed in additional orientations, e.g. 45 degree orientations, to resist deforming of the film 32 within the reinforced area 58 in other directions. While the reinforced area 58 is shown as being generally square in shape, a variety of other shapes are possible.

Figure 16:
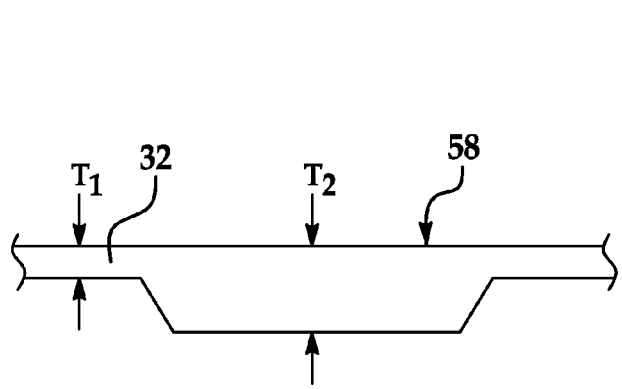
FIG. 16 is an illustration of a sectional view taken along the line 16-16 in FIG. 15.
Figure 17:
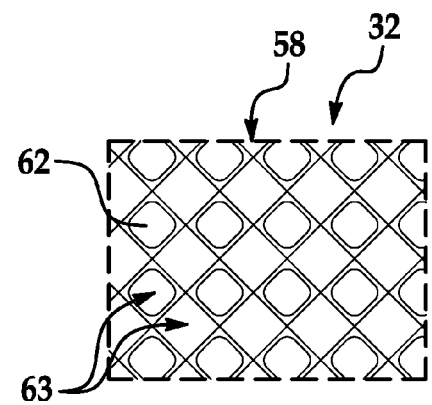
FIG. 17 is an illustration of a carrier film having an integrally formed embossment.

Other reinforcing techniques to prevent or reduce local deforming of the film 32 are possible. For example, as shown in FIG. 16, the substantially non-deformable, reinforced area 58 of FIGS. 13, 14 and 15 may be achieved by increasing the thickness $T_1$ of a carrier film to a thickness $T_2$ in the area 58 of reinforcement. FIG. 17 illustrates another technique for achieving the desired reinforcement, in which the carrier film 32 includes embossed dimples 62 in a desired pattern 63, in this case, diamonds that resist deforming in one or more directions. In some applications, it may be desirable to employ more than one of the above described techniques to achieve substantially non-deformable areas 58. For example, and without limitation, a combination of embossed dimples 62, increased film thickness $T_2$ and reinforcing fibers 58 may be used. It may also be possible to use one or more of the above reinforcement techniques to achieve differing degrees of film elongation in differing regions of the carrier film 32.

Figure 18:
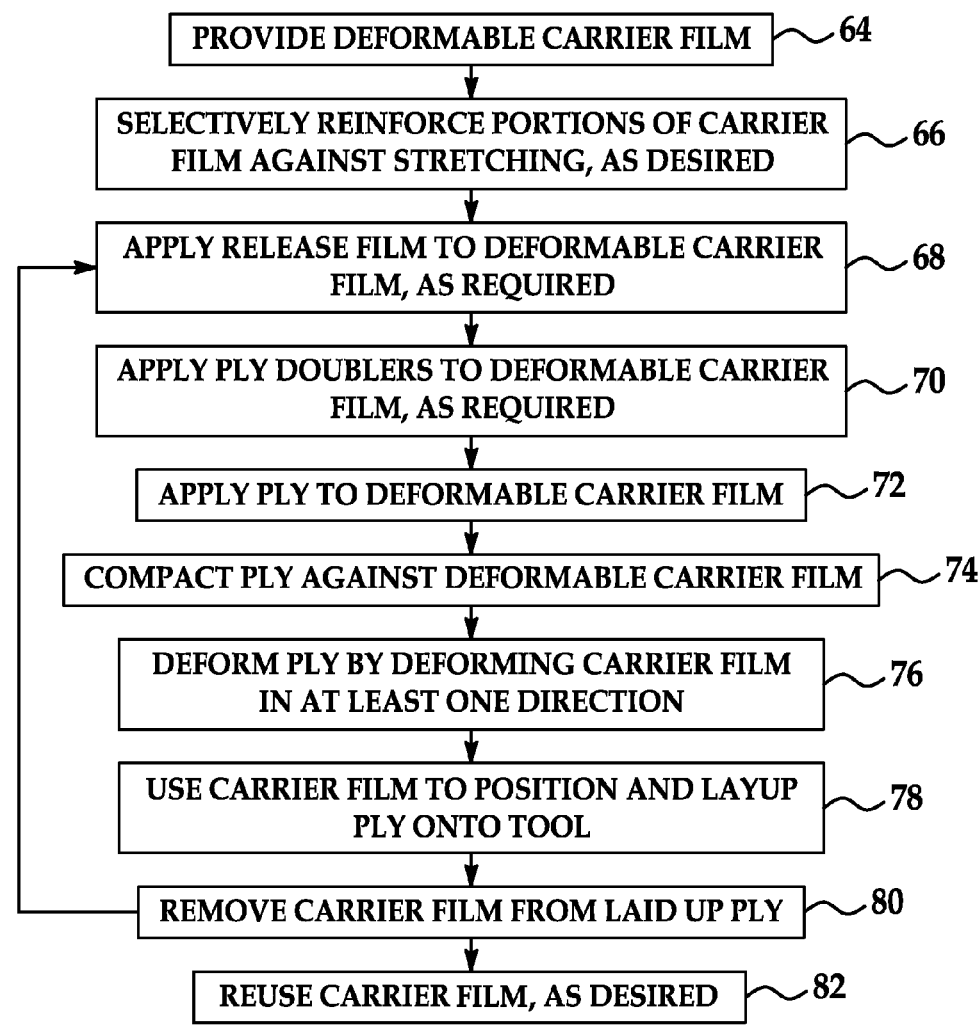
FIG. 18 is an illustration of a flow diagram of a method of laying up a composite structure using a deformable carrier film for ply layup.

Attention is now directed to FIG. 18 which broadly illustrates the steps of a method of laying up plies to form a composite part using the deformable carrier film 32 previously described. Beginning at 64, a deformable carrier film 32 is provided having a size and shape suitable for the application and the plies 30 to be laid up. At 66, portions of the deformable carrier film 32 may be reinforced, as desired. At 68, a release film 56 (FIG. 12) may be applied to the deformable carrier film 32, as required, to aid in the removal of the carrier film 32 from the ply 30 following layup. At 70, one or more ply doublers 54 (FIG. 11) or other materials may be applied to the deformable carrier film 32, as desired.

At 72, a prepreg ply 30 is applied to the deformable carrier either manually, or using automated equipment to lay down courses 49 (FIG. 4) of prepreg material in side-by-side, possibly substantially abutting relationship on the carrier film 32. The ply 30 is laid up on the carrier film 32 in a reversed, mirror image-like fashion such that the left and right of the ply 30 are reversed. By reversing the ply 30 on the film 32, the ply 30 will have the proper orientation when transferred from the film 32 to a tool 90 (see FIG. 20). At 74, the ply material, including any doublers and/or release films are compacted against the deformable carrier film 32. This compaction may be performed mechanically with a hand sweep (not shown) or using a vacuum either with or without the application of heat. At 76, the carrier film 32 is deformed in at least one direction, thereby deforming the ply 30 to the desired shape and/or dimensions best suited for layup on the tool 90, including the shape and topography of the tool 90. At 78, with the ply 30 located on the film 32, and positioned between film 32 and the tool 90, the carrier film 32 is used to position and layup the ply 30 onto a tool 90 (see FIG. 20). At 80, following layup of the ply 30 onto the tool 90, the carrier film 32 is removed, as by peeling it away from the laid-up ply 30. At 82, the carrier film 32 may be reused, if desired, or discarded. Steps 68-80 may be repeated until all of the plies 30 of the part layup have been laid up.

Figure 19:
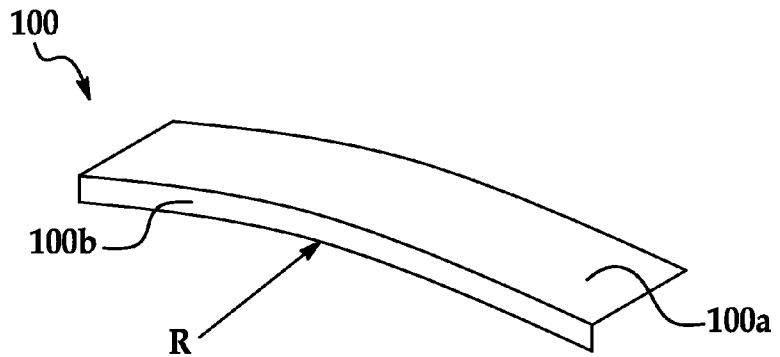
FIG. 19 is an illustration of a perspective view of a composite stiffener.
Figure 20:
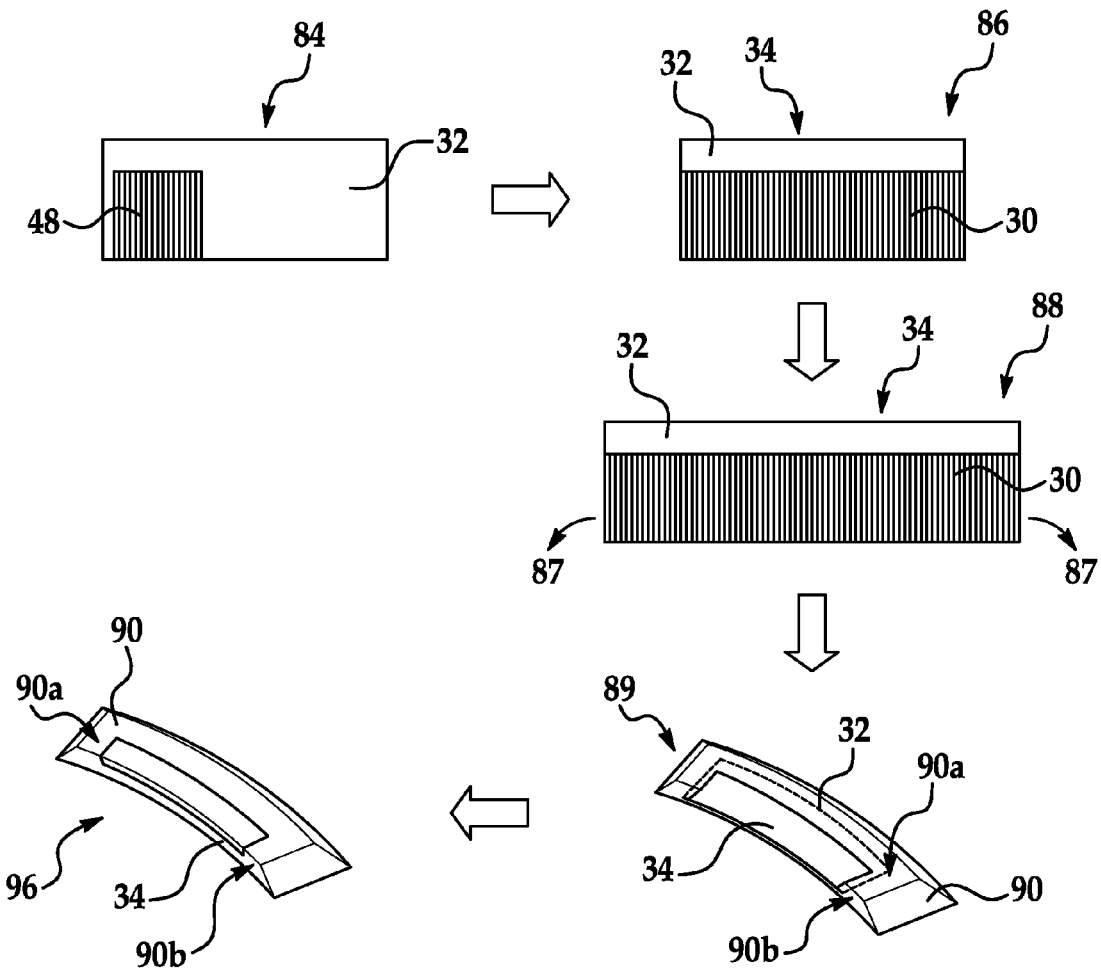
FIG. 20 is an illustration of diagrammatic views showing the steps of a method for laying up composite plies using the deformable carrier film to form the stiffener section shown in FIG. 19.

FIG. 20 diagrammatically illustrates the steps of the layup method shown in FIG. 18, in which a curved composite structure comprising a stiffener 100 shown in FIG. 19 having at least two legs and radius of curvature R is laid up on a curved tool 90. The tool 90 includes two contiguous, curved tool surfaces 90a, 90b for respectively forming a first leg comprising a curved web 100a and a second leg comprising a curved flange 100b of the stiffener 100 shown in FIG. 19. As shown at 84, courses 48 of unidirectional prepreg material are laid down side-by-side on a deformable carrier film 32 to form a completed 90 degree ply 30 shown at 86. The completed ply 30 is then compacted onto the film 32, following which at 88, the film 32 is then stretched and deformed radially as shown by arrows 87 to generally match the curvature of the tool surface 90b. As shown at 89, the ply 30 is deformed into a fan shape and placed onto the tool surface 90b using the film 32 to form the curved flange 100b of the stiffener 100. The carrier film 32 and a peel ply (not shown) may then be removed from the partially formed ply 30. With the carrier film 32 having been removed, the ply 30 is then formed down over the tool surface 90a as shown at 96, to form the web 100b of the stiffener 100. While the above example illustrates the use of the carrier film 32 to form plies along curves in a single plane, the carrier film 32 may also be used to form plies over tools (not shown) having compound curved surfaces, joggles, etc. Moreover, the carrier film 32 may employed to form ply layups having more than two legs, used to fabricate structures possessing a "C" or a "Z" shaped cross section.

Figure 21:
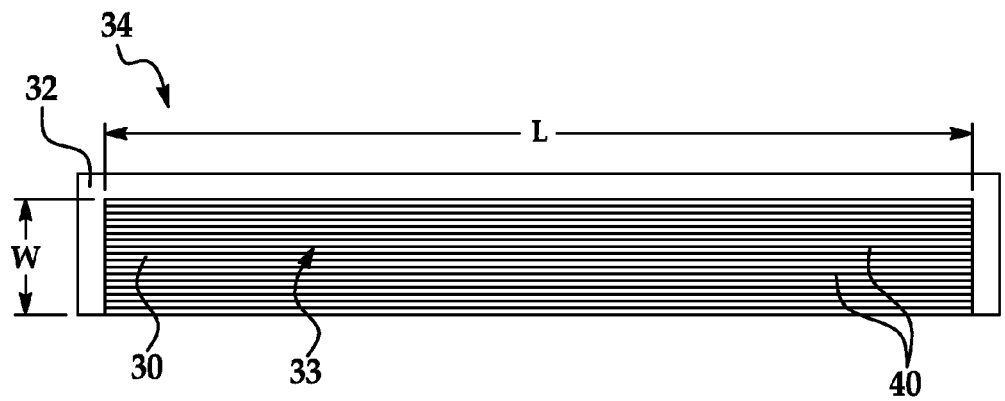
FIG. 21 is an illustration of a plan view of a ply carrier assembly having a zero degree ply.

FIG. 21 illustrates a ply carrier assembly 34 comprising a straight zero degree ply 30 placed on and adhered to a deformable carrier film 32. In contrast to previously discussed embodiments in which the ply 30 is fabricated by steering individual narrow strips of slit tape or tows onto a curved tool (e.g. the curved tool 90 shown in FIG. 20), the zero degree ply 30 shown in FIG. 21 may be formed by laying down a single straight length of tape 33 having a length L, and a width W that may be sufficiently wide to form both the web 100a and the flange 100b of the stiffener 100 shown in FIG. 19. While the illustrated stiffener 100 has only two legs (web 100a and flange 100b), stiffeners may be fabricated having more than two legs and other cross sectional shapes, including but not limited to a "C" shape and a "Z" shape. The tape 33 used to form the ply 30 may comprise unidirectional composite prepreg tape cut from a reel or roll of tape (not shown) in which the unidirectional reinforcing fibers 40 are oriented in the longitudinal direction of the ply carrier assembly 34. In some embodiments, it may be possible to lay up the zero degree ply 30 using a plurality of zero degree tape segments 33a, 33b that are spaced apart from each other along the length of the ply carrier assembly 34, and wherein some of the tape segments 33b may overlap other of the tape segments 33a.

Figure 22:
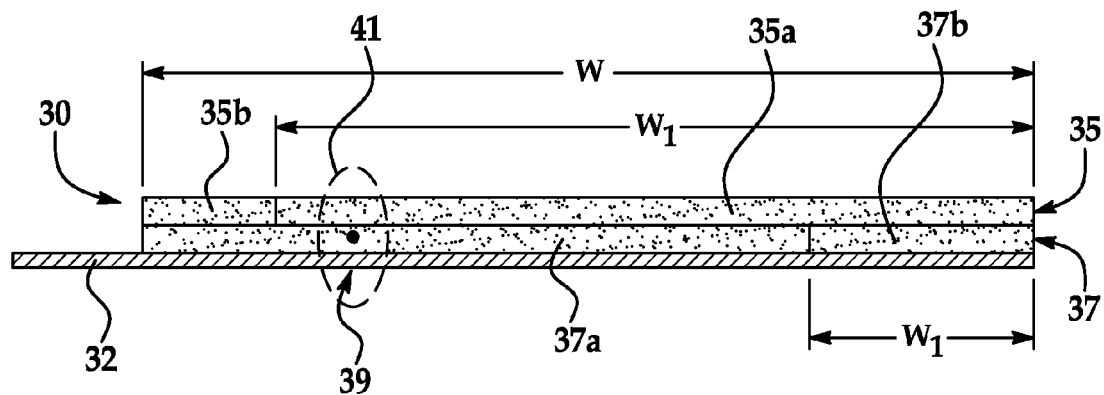
FIG. 22 is an illustration of a cross sectional view of an alternate ply carrier assembly in which the zero degree ply includes multiple layers of tape segments.
Figure 23:
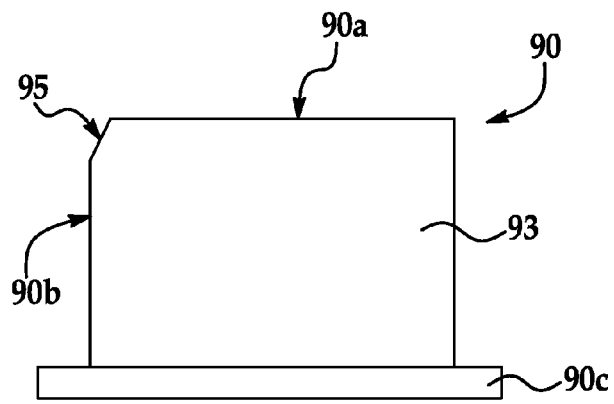
FIG. 23 is an illustration of an end view of a curved forming tool.

As shown in FIG. 22, it may be possible to form the zero degree ply 30 using multiple layers 35, 37 of straight tape having a width $W_1$ that is less than the width W of the ply 30, but greater than that of a typical tow (not shown). In some examples, each layer 35, 37 may comprise one or more segments 35a, 35b, 37a, 37b of tapes which preferably span an area 41 where the ply 30 is to be formed around a curved bend line or axis 39 during a subsequent forming step. Additionally, segments 33a and 33b may be formed in sequential operations in order to eliminate the overlap region from creating the behavior of fiber shearing over long distances. This enables an infinite length of zero degree reinforcement within a cured laminate while limiting the shear stresses to those associated with finite lengths.

Figure 24:
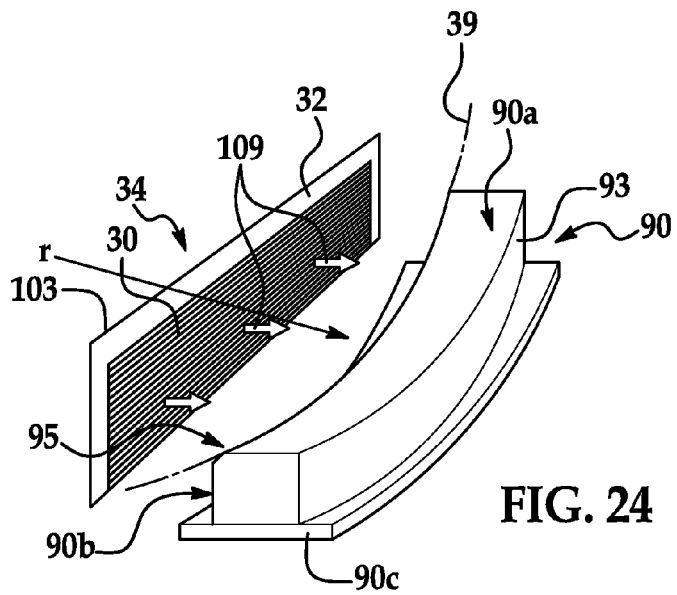
FIG. 24 is an illustration of a perspective view of the curved forming tool shown in FIG. 23, with a ply carrier assembly positioned in readiness to be formed onto the tool.

FIG. 24 illustrates a curved forming tool 90 similar to the curved tool 90 previously discussed in connection with FIG. 20. The curved forming tool 90 comprises a curved main body 93 supported on a tool base 90c. The forming tool 90 includes a first curved forming surface 90b used to form a first leg of a structure such as the flange 100b of the stiffener 100 shown in FIG. 19, and a second curved forming surface 90a for forming a second leg of the structure such as the web 100a of stiffener 100. A chamfer 95 or a radius corner (not shown) may be provided at the intersection of the curved surfaces 90a, 90b in order to assist in folding or bending one of more of the zero degree plies 30 during the forming process so as to avoid stress concentrations in the ply being formed.

Figure 25:
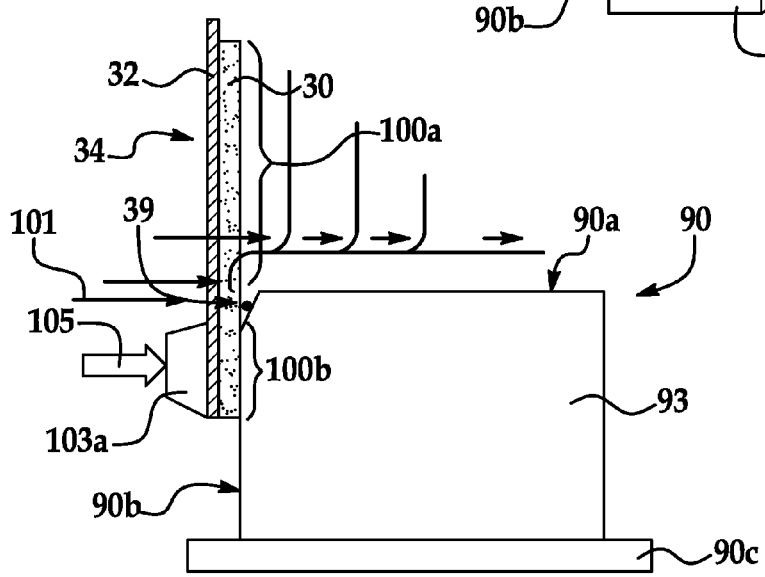
FIG. 25 is an illustration similar to FIG. 23 but showing a first portion of a ply carrier assembly having been steered and clamped onto a first curved surface of the tool.

FIG. 25 shows a ply carrier assembly 34 having a substantially flat zero degree ply 30 about to be steered onto the tooling 90. In this example, the ply carrier assembly 34 has been placed on a substantially flat tool 103 that may be used to transport the ply carrier assembly 34 to the location of the tool 90, and which may also be used to assist in steering the ply 30 onto the curved tool surface 90b, as shown by the arrows 109. The numeral 39 designates a curved axis or bend line having a radius of curvature r about which the ply carrier assembly 34 will be folded or bent in a later discussed forming step.

Figure 26:
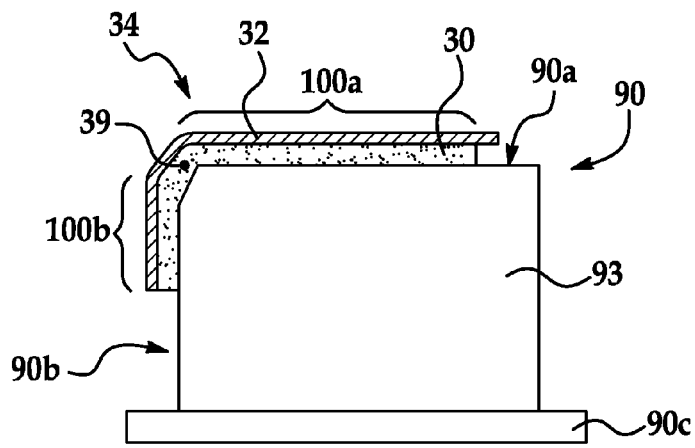
FIG. 26 is an illustration similar to FIG. 25 but showing a second portion of the ply carrier assembly having been formed onto a second curved surface of the tool.
Figure 27:
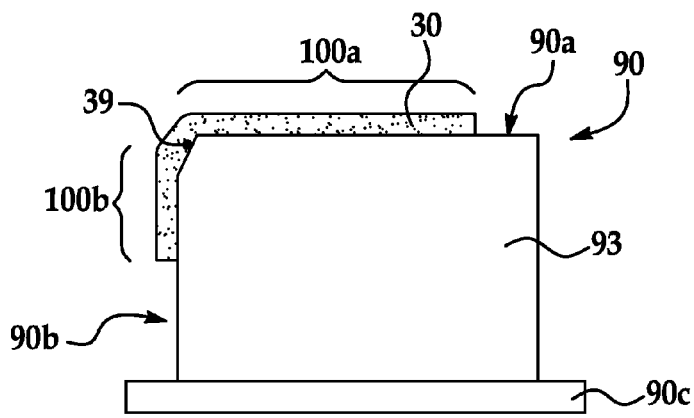
FIG. 27 is an illustration similar to FIG. 26 but showing the deformable carrier film having been removed from the formed ply.
Figure 28:
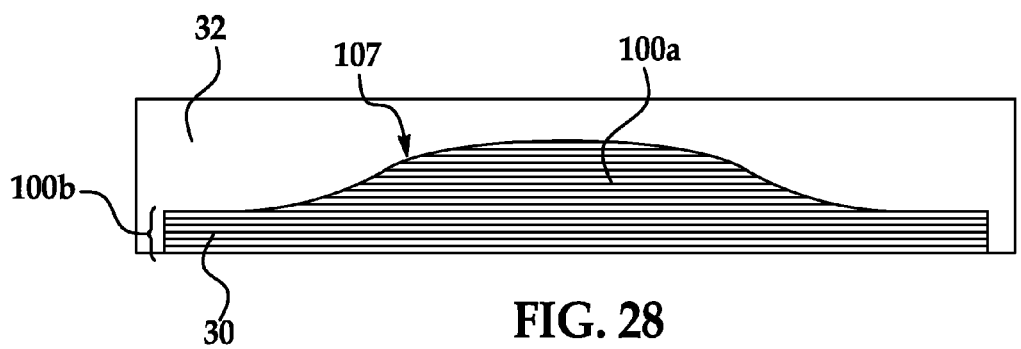
FIG. 28 is an illustration of a plan view of an alternate ply carrier assembly in which an edge of a zero degree ply has been contoured.

FIG. 26 illustrates the ply carrier assembly 34 that has been steered onto and conformed to the first curved tool surface 90b of the tool 90, and wherein the flange portion 100b of the ply 30 has been clamped against the curved tool surface 90b using a suitable clamping device 103a and clamping force shown at 105. With the flange portion 100b clamped against the curved tool surface 90b, the remaining web portion 100a of the ply 30 is formed onto the second curved tool surface 90a, as shown by the arrow 101. In this second forming step, the web portion 100a is pushed over the bend line 39, creating a "Z" shape in the carrier film and web portion 100a of the ply while the flange portion 100b of the ply 30 remains clamped against the first curved tool surface 90b. Following this second forming step, the zero degree ply 30 is fully formed onto the tool surface 90a, as shown in FIG. 27. During each of the forming steps described above, the carrier film 32 may be stretched or otherwise deformed in order to alter the orientation of the fibers 40 (FIG. 21), as the tape 33 is sheared onto the tool surfaces 90a, 90b.

As previously discussed, the carrier film 31 functions to stabilize the ply 30 as it is sheared into place on the tool 90, and may be deformed, as by stretching during the forming process to aid in controlling the orientation of the fibers 40 in the tape 33 so that they deform in a desired manner and assume a desired orientation that results in a stiffener 100 which exhibits desired performance characteristics.

Figure 29:
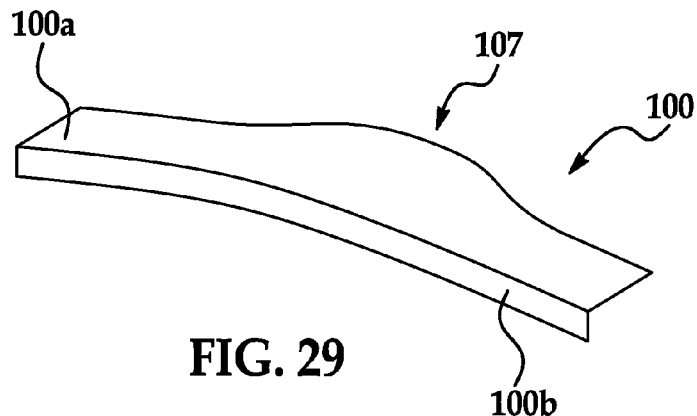
FIG. 29 is an illustration of a perspective view of a composite structure having a contoured edge fabricated from the contoured ply shown in FIG. 28.

As the ply 30 is being laid up onto the carrier film 30, it may be possible to trim one or more edges of the ply 30 to achieve a desired edge contour on the finished part. For example, referring to FIG. 29, a zero degree ply 30 formed from unidirectional prepreg tape includes a web portion 100a and a flange portion 100b. The outer edge of the web portion 100a may be trimmed as by cutting to form a contoured edge 107 prior to the placing the ply 30 on the carrier film 31. Following forming of the ply 30 over the contoured tool 90 shown in FIGS. 24-28, the finished stiffener 100 includes a flange 100a having the contoured edge 107. In other embodiments, it may be possible to form the contoured edge 107 by cutting both the ply 30 and the carrier film 31 after the ply 30 has been placed on the carrier film 31.

Figure 30:
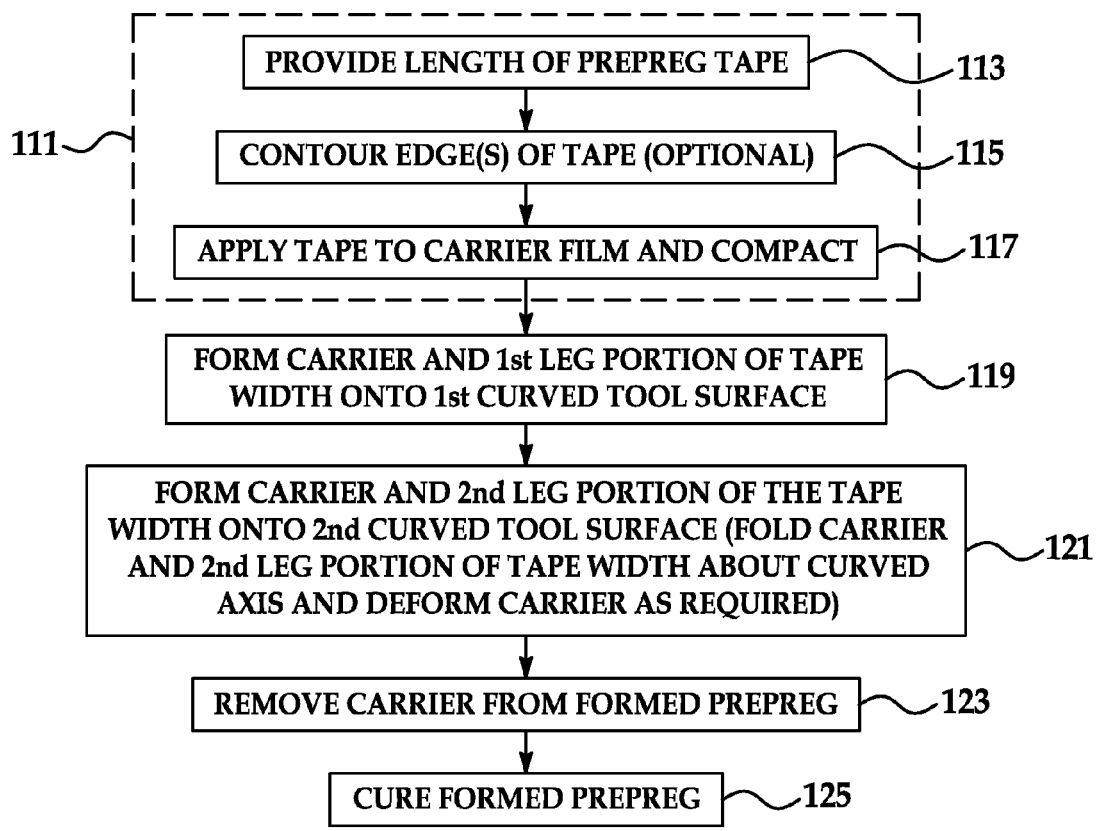
FIG. 30 is an illustration of a flow diagram of a method of forming a curved composite structure.

Attention is now directed to FIG. 30 which illustrates the overall steps of a method of fabricating a composite structure, such as the stiffener 100 shown in FIGS. 19 and 30 that has compound curves or contours. At 111 a ply 30 is laid up by providing a length of unidirectional prepreg tape at 113, contouring the edges of the tape, if desired at 115 and then applying and compacting the tape on a carrier film 31 at step 117. At 119, the carrier film 31 and a first leg or flange portion 100b of the ply 30 is formed onto a first curved tool surface 90b, as previously described in connection with FIGS. 25 and 26. Next, at 121, the carrier film 31 and a second leg or web portion 100a of the prepreg tape ply 30 is formed onto the second curved tool surface 90a, (see FIGS. 26 and 27). This second step of the forming process may be carried out by folding or bending the second leg or web portion 100a of the tape ply 30 about the bend line 39 (FIG. 25) while the carrier film 31 is being deformed, as by stretching, to control the fiber angles during the forming process. Following step 121, the carrier film 31 may be removed from the formed prepreg, as shown at 123. Finally, at 125, the formed prepreg may be cured.

As depicted in the previous Figures, a deformable carrier may be used to place plies of various orientations onto a tool. The illustrative embodiments recognize and take into account that plies will deform and change shape differently based on the orientation of fibers within a ply. Specifically, fibers within a ply will not stretch in the direction of the fiber orientation.

Further, the illustrative embodiments recognize and take into account that a combination of the shape of the tool and the orientation of fibers within a ply may cause a composite prepreg ply to produce an undesired shape on a tool. Accordingly, the illustrative embodiments recognize and take into account that it may be desirable to cut a composite prepreg ply to compensate for at least one of the orientation of the fibers and the shape of the tool. In other words, the illustrative embodiments recognize and take into account that a composite prepreg ply may be cut into a cut shape prior to placement such that after applying the composite prepreg ply having the cut shape to the tool, the resulting ply on the tool may have the desired shape.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required.

Yet further, the illustrative embodiments recognize and take into account placing composite doublers accurately on curved tools may take an undesirable amount of time. As used herein, a composite doubler comprises a composite material having smaller dimensions than a full ply for a composite part. In some illustrative examples, a composite doubler may not contact any edges of a tool or of the part layup. The illustrative embodiments recognize locating a composite doubler which does not contact an edge of a tool may take an undesirable amount of time.

Figure 31:
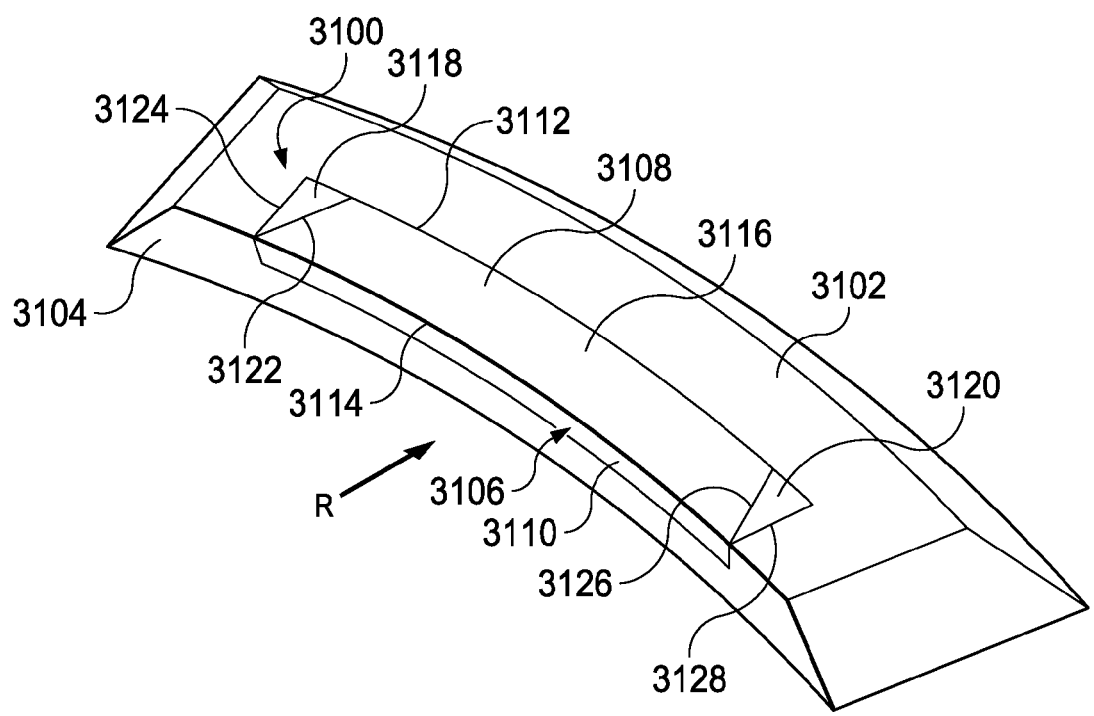
FIG. 31 is an illustration of a desired shape and a resultant shape for a composite prepreg ply in accordance with an illustrative embodiment.

Turning now to FIG. 31, an illustration of a desired shape and a resultant shape for a composite prepreg ply in accordance with an illustrative embodiment. Tool 3100 of FIG. 31 may be a tool such as tool 90.

As depicted, tool 3100 includes two contiguous, curved tool surfaces, first surface 3102 and second surface 3104. In this illustrative example, a ply may have desired shape 3106. Desired shape 3106 may include first leg 3108 and second leg 3110. First leg 3108, as depicted, may form a curved web. Second leg, 3110, as depicted, may form a curved flange. Desired shape 3106 may be formed by using a deformable carrier film to stretch a composite prepreg ply and apply the composite prepreg ply to tool 3100. A composite prepreg ply having a rectangular shape and a 90 degree orientation may be stretched to form desired shape 3106, as depicted in FIG. 20. However, a composite prepreg ply having a rectangular shape and a zero degree orientation as in FIG. 21 may not form desired shape 3106.

Specifically, edge 3112 of desired shape 3106 may have a greater length than a length of edge 3114 of desired shape 3106, as depicted. Edge 3112 of desired shape 3106 may have a greater length than a length of edge 3114 of desired shape due to radius of curvature R of tool 3100.

Although edge 3112 is longer than edge 3114, fibers with a zero degree orientation in a composite prepreg ply, such as fibers 40 of FIG. 21 will not stretch. Accordingly, a composite prepreg ply having a rectangular shape and a zero degree orientation may instead form resultant shape 3116. As depicted, resultant shape 3116 does not cover portion 3118 and portion 3120 of desired shape 3106. As depicted, edge 3122 of resultant shape 3116 is at an angle relative to edge 3124 of desired shape 3106. As a result, resultant shape 3116 does not cover portion 3118. As depicted, edge 3126 of resultant shape 3116 is at an angle relative to edge 3128 of desired shape 3106. As a result, resultant shape 3116 does not cover portion 3120.

As resultant shape 3116 is different than desired shape 3106, a composite prepreg ply having a rectangular shape and zero degree orientation may not be used to form the ply on tool 3100. Instead, a composite prepreg ply having a zero degree orientation may first be cut to a cut shape to compensate for at least one of the shape of tool 3100 and the fiber orientation of the composite prepreg ply.

Figure 32:
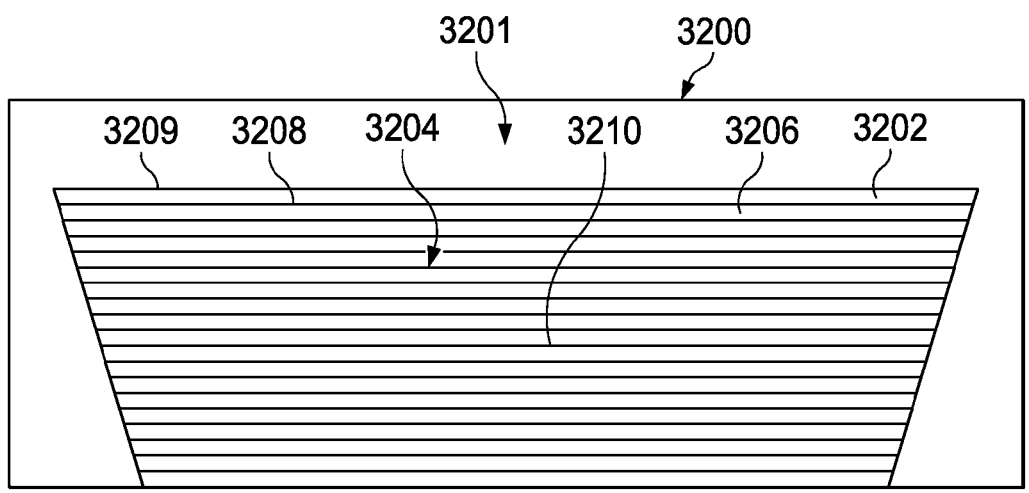
FIG. 32 is an illustration of a cut shape for a composite prepreg ply in accordance with an illustrative embodiment.

Turning now to FIG. 32, an illustration of a cut shape for a composite prepreg ply is depicted in accordance with an illustrative embodiment. Carrier 3201 may be a deformable carrier film such as carrier film 32 of FIG. 6 and FIGS. 10-17. Composite prepreg ply 3202 on carrier 3201 may be used to form a ply having desired shape 3106 on tool 3100 of FIG. 31. Composite prepreg ply 3202 on carrier 3201 may also be referred to as ply carrier assembly 3200.

As depicted, composite prepreg ply 3202 is applied to carrier 3201. Composite prepreg ply 3202 has fibers 3204 which have a zero degree orientation. Composite prepreg ply 3202 has cut shape 3206. As depicted, cut shape 3206 is a trapezoidal shape. In other illustrative examples, composite prepreg ply 3202 may have other shapes for cut shape 3206. Cut shape 3206 may compensate for at least one of an orientation of fibers 3204 and a shape of a tool, such as tool 3100 of FIG. 31. Specifically, cut shape 3206 may compensate for a shearing effect due to the orientation of fibers 3204.

As depicted, fiber 3208 of fibers 3204 is nearer edge 3209 of cut shape 3206 than fiber 3210 of fibers 3204. Edge 3209 may correspond to edge 3112 of desired shape 3106 on tool 3100 of FIG. 31. Due to cut shape 3206, fiber 3208 has a length greater than a length of fiber 3210. Fiber 3208 may have a greater length than a length of fiber 3210 to compensate for edge 3112 having a greater length than a length of edge 3114 of tool 3100 of FIG. 31.

Cut shape 3206 is only one illustrative example of a shape of a composite prepreg ply. Cut shape 3206 may comprise any desirable shape to compensate for at least one of a shape of a tool and an orientation of fibers in the composite prepreg ply. Other illustrative examples of cut shape 3206 may include triangular, hexagonal, or other desirable shapes.

Further, composite prepreg ply 302 is only one illustrative example of a composite prepreg ply. In some illustrative examples composite prepreg ply 302 may have a 45 degree fiber orientation.

Figure 33:
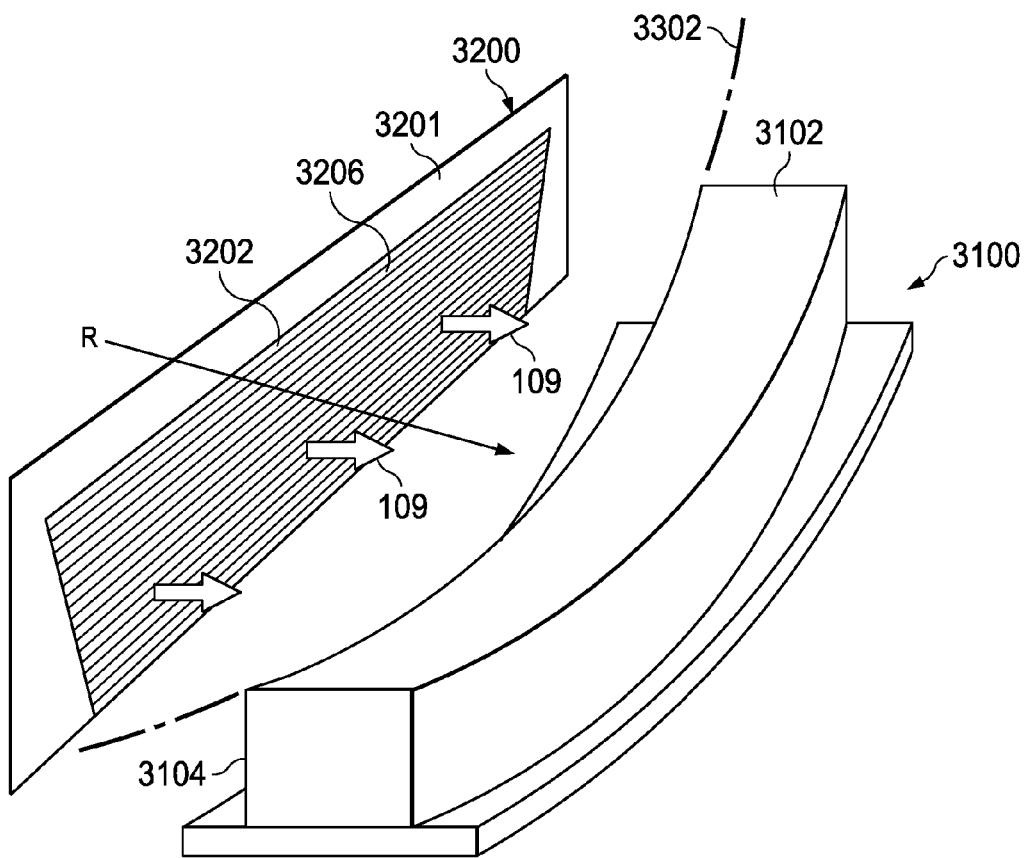
FIG. 33 is an illustration of a perspective view of the curved forming tool shown in FIG. 23, with a ply carrier assembly positioned in readiness to be formed onto the tool in accordance with an illustrative embodiment.

Turning now to FIG. 33, an illustration of a perspective view of the curved forming tool shown in FIG. 31, with a ply carrier assembly positioned in readiness to be formed onto the tool in accordance with an illustrative embodiment. The ply carrier assembly may be ply carrier assembly 3200 of FIG. 32. The tool may be tool 3100 of FIG. 31.

FIG. 33 shows ply carrier assembly 3200 having composite prepreg ply 3202 about to be steered onto tool 3100. As depicted composite prepreg ply 3202 comprises a substantially flat zero degree ply having cut shape 3206. Composite prepreg ply 3202 may be steered onto second surface 3104, as shown by the arrows 109. Tool 3102 has curved axis 3302 having a radius of curvature r about which ply carrier assembly 3200 may be folded or bent.

As depicted, only a single composite prepreg ply, composite prepreg ply 3202, is present on carrier 3201. In some illustrative examples, by applying composite prepreg ply 3202 individually using carrier 3201, composite prepreg ply 3202 may be applied substantially without wrinkles. In some illustrative examples, properties of carrier 3201 may allow application of composite prepreg ply 3202 to tool 3100 substantially without wrinkles.

Figure 34:
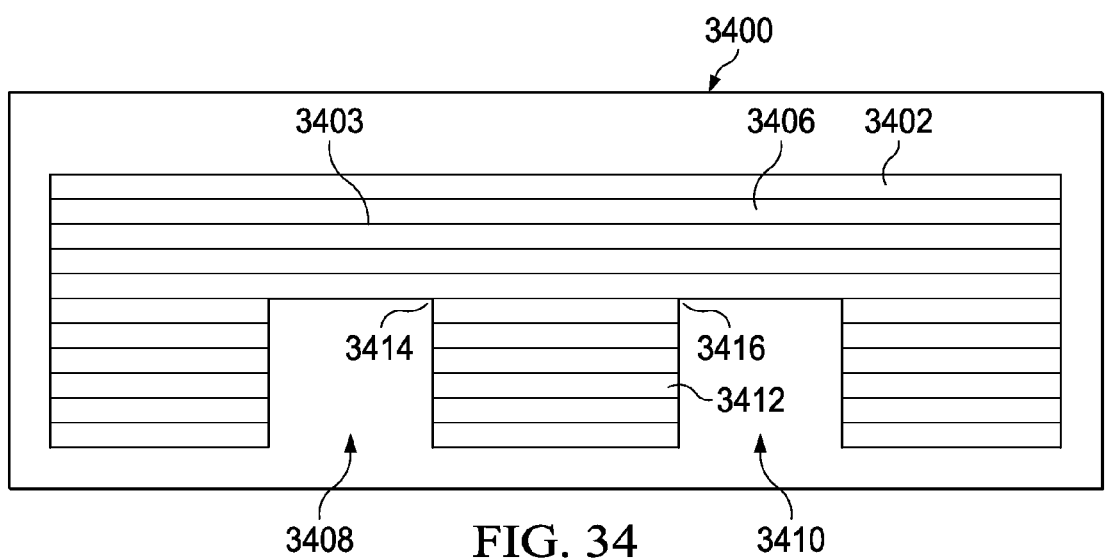
FIG. 34 is an illustration of another example of a cut shape for a composite prepreg ply in accordance with an illustrative embodiment.

Turning now to FIG. 34, an illustration of another example of a cut shape for a composite prepreg ply is depicted in accordance with an illustrative embodiment. As depicted, carrier 3400 has composite prepreg ply 3402 applied.

Composite prepreg ply 3402 has cut shape 3406. In some illustrative examples, cut shape 3406 may be selected based on a desired thickness for a resultant part in areas of the part. In a composite part, some areas may have greater thicknesses such that at least one of pad-ups or composite doublers may be present in those areas. In a composite part, some areas may have a lesser thickness such that at least one of fewer plies or cut-outs may be present in those areas.

In this illustrative example, cut shape 3406 has cutout 3408 and cutout 3410. Cutout 3408 and cutout 3410 may allow for areas of lesser thickness in a resulting part.

Carrier 3400 may allow application of composite prepreg ply 3402 to a tool. Specifically, carrier 3400 may allow application of composite prepreg ply 3402 having cut shape 3406 without substantially cracking or breaking of composite prepreg ply 3402.

Typically, applying composite prepreg ply 3402 having cut shape 3406 without carrier 3400, for instance, by hand, would result in cracking or breaking of composite prepreg ply 3402. This cracking or breaking may be concentrated in portion 3412. In some illustrative examples, cracking or breaking may occur in corner 3414. In some illustrative examples, cracking or breaking may occur in corner 3416.

The properties of at least one of carrier 3400, the application methodology, and composite prepreg ply 3402 may allow for application of composite prepreg ply 3402 without cracking or breaking of composite prepreg ply 3402. Properties of carrier 3400 which may affect application of composite prepreg ply 3402 to a tool may include at least one of a tack level of carrier 3400, an elasticity of carrier 3400, a thickness of carrier 3400, any reinforcements of carrier 3400, and any other desirable property. The tack level of carrier 3400 may be influenced by at least one of the material comprising carrier 3400 and the amount of contamination on a surface of carrier 3400. The amount of contamination on surface of carrier 3400 may be affected by the number of plies which have been placed by carrier 3400. In some illustrative examples, carrier 3400 may be washed to remove debris after a number of plies have been applied using carrier 3400. In one illustrative example, carrier 3400 may be washed after placing between about 40 and about 60 plies. An elasticity of carrier 3400 may be influenced by at least one of the material comprising carrier 3400, any reinforcements in carrier 3400, and the usage of carrier 3400. Usage of carrier 3400 may be measured by at least one of number of times carrier 3400 has been used, a length of time carrier 3400 has been used, or other suitable measurement. In one illustrative example, carrier 3400 may be used for about 2 to 3 months before being replaced.

Properties of application methodology may include at least one of application pressure by carrier film 3400, temperature at which composite prepreg ply 3402 is applied, temperature of the tool, tack level between the plies on the tool, or other parameters of the application methodology. Properties of composite prepreg ply 3402 may include at least one of a tack level of composite prepreg ply 3402, the orientation of fibers 3403 within composite prepreg ply 3402, cut shape 3406 of composite prepreg ply 3402, a desired shape for composite prepreg ply 3402 on a tool, or other desirable properties of composite prepreg ply 3402.

Figure 35:
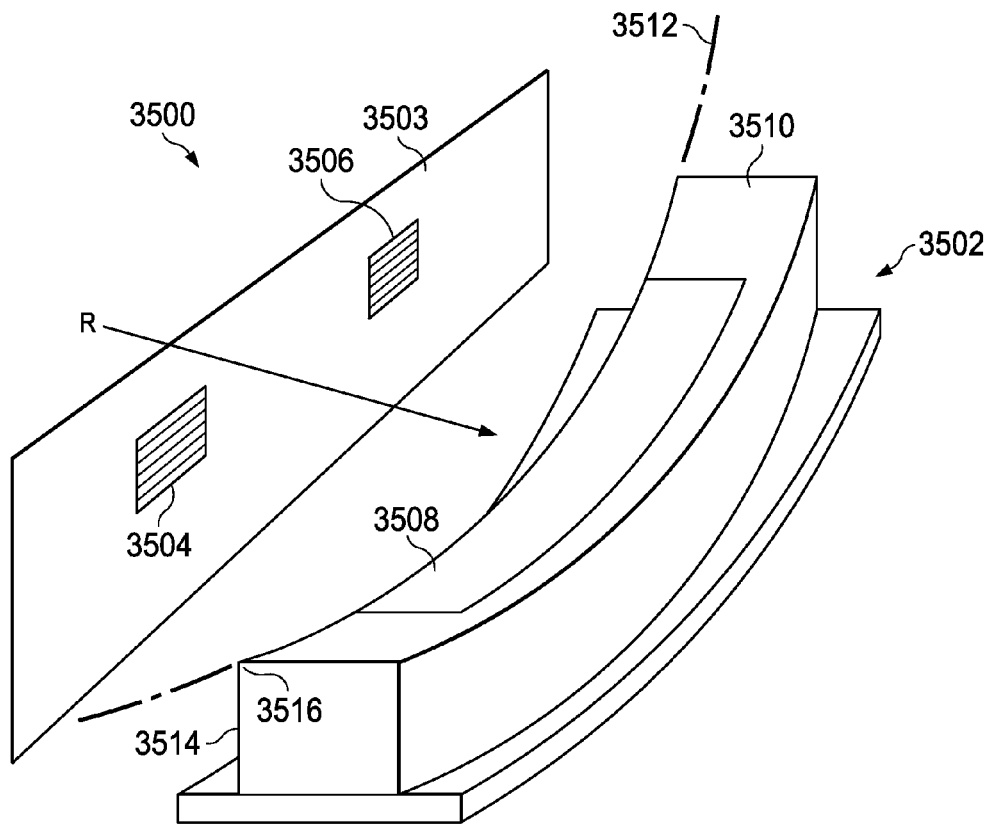
FIG. 35 is an illustration of a number of doublers to be placed on a tool in accordance with an illustrative embodiment.

Turning now to FIG. 35, an illustration of a number of composite doublers to be placed on a tool is depicted in accordance with an illustrative embodiment. As depicted ply carrier assembly 3500 is positioned relative to tool 3502. Tool 3502 may be tool 3100 of FIG. 31.

As depicted, ply carrier assembly 3500 has carrier 3503, composite doubler 3504, and composite doubler 3506. As depicted, composite doubler 3504 and composite doubler 3506 are formed from composite material having fibers with a zero degree orientation. In other illustrative examples, at least one of composite doubler 3504 and composite doubler 3506 may be formed of composite material having a different fiber orientation. For example, at least one of composite doubler 3504 and composite doubler 3506 may have a 45 degree fiber orientation. In another example, at least one of composite doubler 3504 and composite doubler 3506 may have a 90 degree fiber orientation.

As depicted, both composite doubler 3504 and composite doubler 3506 have smaller dimensions than resulting part area 3508. Further, both composite doubler 3504 and composite doubler 3506 have smaller dimensions than first surface 3510 of tool 3502.

Curved axis 3512 of tool 3502 has a radius of curvature r about which ply carrier assembly 3500 may be folded or bent. As depicted, when ply carrier assembly 3500 is used to apply composite doubler 3504 and composite doubler 3506 to tool 3502, neither composite doubler 3504 nor composite doubler 3506 contact second surface 3514 of tool 3502. Further, when ply carrier assembly 3500 is used to apply composite doubler 3504 and composite doubler 3506 to tool 3502, neither composite doubler 3504 nor composite doubler 3506 contact edge 3516 of tool 3502.

Accordingly, carrier 3503 may provide accurate placement of composite doubler 3504 and composite doubler 3506 despite composite doubler 3504 and composite doubler 3506 being positioned over first surface 3510. In some illustrative examples, carrier 3503 may place composite doubler 3504 and composite doubler 3506 with an accuracy within about 0.10 inches.

Figure 36:
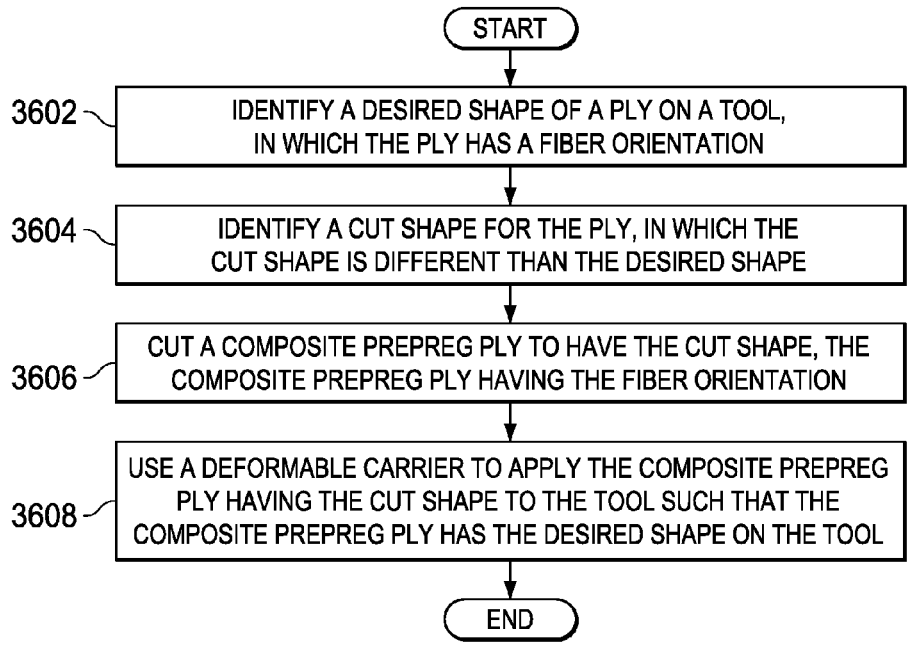
FIG. 36 is an illustration of a flowchart of a process for laying up a composite prepreg ply on a tool in accordance with an illustrative embodiment.

Turning now to FIG. 36, an illustration of a flowchart of a process for laying up a composite prepreg ply on a tool is depicted in accordance with an illustrative embodiment. The process may be implemented to form a ply having a desired shape such as desired shape 3106 of FIG. 31.

The process may begin by identifying a desired shape of a ply on a tool, in which the ply has a fiber orientation (operation 3602). In one illustrative example, this desired shape may be desired shape 3106 of FIG. 31. The process may then identify a cut shape for the ply, in which the cut shape is different than the desired shape (operation 3604). In one illustrative example, the cut shape may be cut shape 3206 of FIG. 32. The process may then cut a composite prepreg ply to have the cut shape, the composite prepreg ply having the fiber orientation (operation 3606). In some illustrative examples, cutting the composite prepreg ply may take place prior to placing the composite prepreg ply onto a carrier. In other illustrative embodiments, the composite prepreg ply may be cut while on a deformable carrier.

The process may then use a deformable carrier to apply the composite prepreg ply having the cut shape to the tool such that the composite prepreg ply has the desired shape on the tool (operation 3608). In one illustrative example, the deformable carrier may be carrier 3201 which may apply composite prepreg ply 3202 to tool 3100 such that composite prepreg ply 3202 has desired shape 3106. The process may terminate thereafter.

Figure 37:
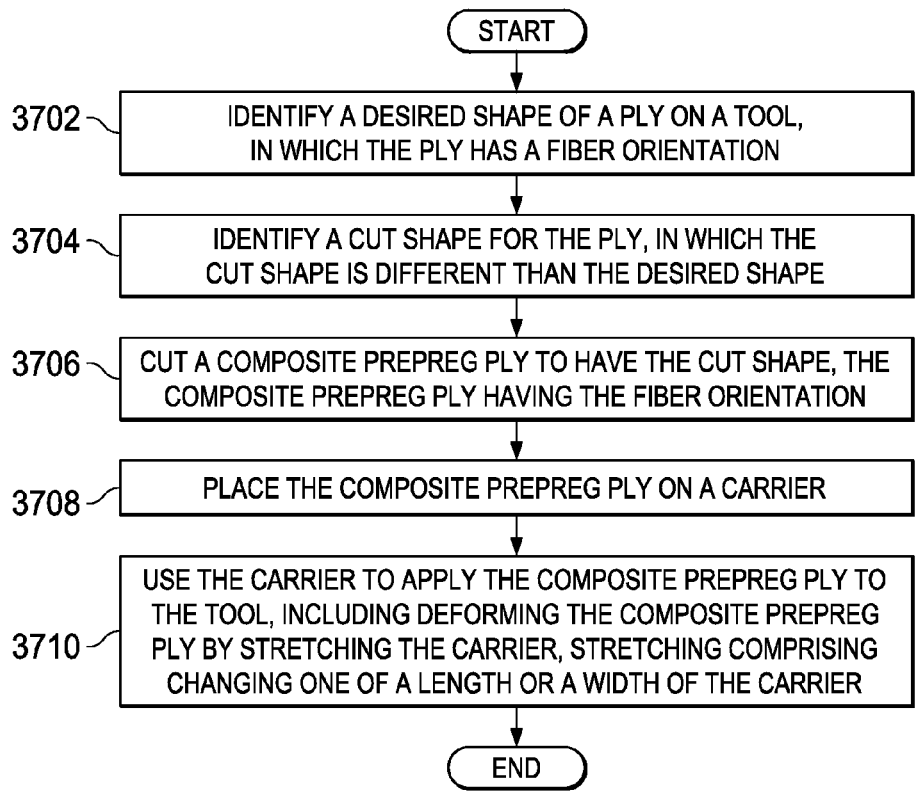
FIG. 37 is an illustration of a flowchart of a process for laying up a composite prepreg ply on a tool in accordance with an illustrative embodiment.

Turning now to FIG. 37, an illustration of a flowchart of a process for laying up a composite prepreg ply on a tool is depicted in accordance with an illustrative embodiment. The process may be implemented to form a ply having a desired shape such as desired shape 3106 of FIG. 31.

The method may begin by identifying a desired shape of a ply on a tool, in which the ply has a fiber orientation (operation 3702). In one illustrative example, this desired shape may be desired shape 3106 of FIG. 31. The method may then identify a cut shape for the ply, in which the cut shape is different than the desired shape (operation 3704). In one illustrative example, the cut shape may be cut shape 3206 of FIG. 32. The method may then cut a composite prepreg ply to have the cut shape, the composite prepreg ply having the fiber orientation (operation 3706). In some illustrative examples, cutting the composite prepreg ply may take place prior to placing the composite prepreg ply onto a carrier. In other illustrative embodiments, the composite prepreg ply may be cut while on a deformable carrier.

The method may then place the composite prepreg ply on a carrier (operation 3708). In one illustrative example, the deformable carrier may be carrier 3201. The method may then use the carrier to apply the composite prepreg ply to the tool, including deforming the composite prepreg ply by stretching the carrier, stretching comprising changing one of a length or a width of the carrier (operation 3710). In one illustrative example, the deformable carrier may be carrier 3201 which may apply composite prepreg ply 3202 to tool 3100 such that composite prepreg ply 3202 has desired shape 3106. The process may terminate thereafter.

Figure 38:
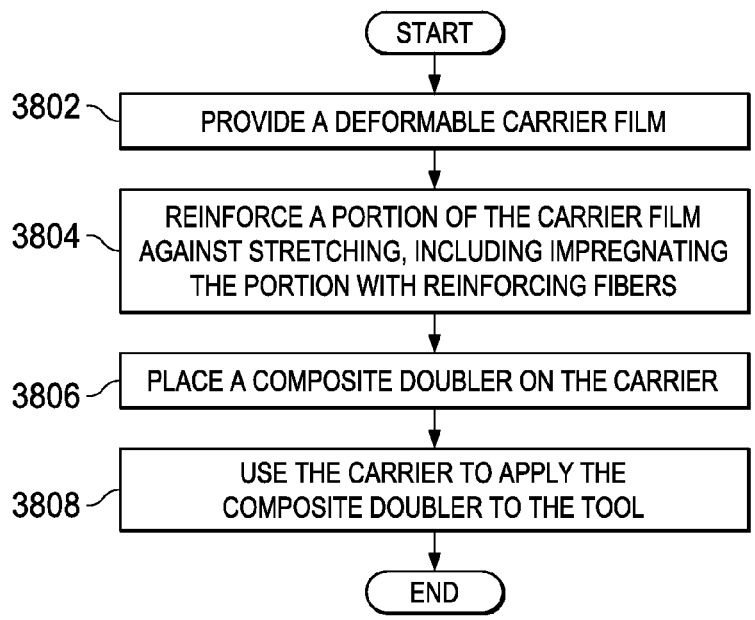
FIG. 38 is an illustration of a flowchart of a process for laying up a composite doubler on a tool in accordance with an illustrative embodiment.

Turning now to FIG. 38, an illustration of a flowchart of a process for laying up a composite doubler on a tool is depicted in accordance with an illustrative embodiment. The method may begin by providing a deformable carrier film (operation 3802). In one illustrative example, the deformable carrier film may be carrier 3200 of FIG. 32. In one illustrative example, the deformable carrier film may be deformable carrier film 32 of FIGS. 13-17. The method may then reinforce a portion of the carrier film against stretching, including impregnating the portion with reinforcing fibers (operation 3804). In some illustrative examples, deformable carrier film 32 may be reinforced with reinforcing fibers 60. The method may then place a composite doubler on the carrier (operation 3806). The process may then use the carrier to apply the composite doubler to the tool (operation 3808). The process may terminate thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Referring to FIGS. 39 and 40, embodiments of the disclosure may be used in the context of an aircraft manufacturing and service method 102 as shown in FIG. 39 and an aircraft 104 as shown in FIG. 40. During pre-production, exemplary method 102 may include specification and design 106 of the aircraft 104 and material procurement 108. During production, component and subassembly manufacturing 110 and system integration 112 of the aircraft 104 takes place. During step 110, the disclosed method and apparatus may be employed to fabricate composite parts such as fuselage frame sections and stiffeners which are then assembled at step 112. Thereafter, the aircraft 104 may go through certification and delivery 114 in order to be placed in service 116. While in service by a customer, the aircraft 104 may be scheduled for routine maintenance and service 118 (which may also include modification, reconfiguration, refurbishment, and so on).

Each of the processes of method 102 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 40, the aircraft 104 produced by exemplary method 102 may include an airframe 120 with a plurality of systems 122 and an interior 124. The disclosed method and apparatus may be employed to fabricate frame sections and stiffeners which form part of the airframe 120. Examples of high-level systems 122 include one or more of a propulsion system 126, an electrical system 128, a hydraulic system 130, and an environmental system 132. Any number of other systems may be included. Although an aerospace example is shown, the principles of the invention may be applied to other industries, such as the automotive industry.

The apparatus embodied herein may be employed during any one or more of the stages of the production and service method 102. For example, components or subassemblies corresponding to production process 110 may be fabricated or manufactured in a manner similar to components or subassemblies produced while the aircraft 104 is in service. Also, one or more apparatus embodiments may be utilized during the production stages 110 and 112, for example, by substantially expediting assembly of or reducing the cost of an aircraft 104. Similarly, one or more apparatus embodiments may be utilized while the aircraft 104 is in service, for example and without limitation, to maintenance and service 118.

Composite prepreg is laid up over a tool by placing prepreg material on a carrier film and using the carrier film to apply the prepreg material to the tool. The prepreg is conformed to contours of the tool by deforming the carrier film.

According to one embodiment, a method is provided of laying up a composite part on a tool. The method comprises applying a composite prepreg over a deformable carrier and deforming the prepreg by deforming the carrier. The carrier is used to apply the prepreg to the tool. The method further includes removing the carrier from the deformed prepreg. Applying the prepreg includes compacting a prepreg ply face-to-face against the carrier. The carrier is removed from the deformed prepreg after the prepreg has been applied to the tool. Applying the prepreg includes applying courses of unidirectional prepreg tape in side-by-side relationship on the carrier. The method may further comprise applying at least one of a release film and a ply doubler on the carrier before the prepreg is applied to the carrier, and using the carrier to apply the at least one of the release film and the doubler to the tool. The method may also include reinforcing at least a portion of the carrier against deforming. Deforming the carrier is performed as the prepreg is being applied to the tool.

According to another embodiment, a method is provided of changing the grade of unidirectional prepreg fibers. The method comprises adhering the unidirectional prepreg fibers to a deformable carrier film, and increasing the spacing between the prepreg fibers by deforming the film in a direction transverse to the direction of the fibers.

According to still another embodiment, a method is provided of laying up composite prepreg over a contoured tool. The method comprises placing prepreg material on a carrier film; and using the carrier film to apply the prepreg material to the tool. Using the carrier film to apply the prepreg material includes deforming the prepreg material by deforming the film as the prepreg material is being applied to the tool. Placing the prepreg material on the carrier film includes laying down courses of unidirectional pre preg fiber tape in side-by-side relationship on the carrier film, and compacting the courses against the carrier film. The method further comprises removing the carrier film from the prepreg material after the prepreg material has been applied to the tool. Adhering the prepreg material to the carrier film includes compacting the prepreg material against the carrier film. The carrier film is deformed to conform the prepreg material to contours on the tool. The method may further comprise reinforcing at least a portion of the carrier film against deforming. The steps of placing prepreg material on a carrier film and using the carrier film to apply the prepreg material to the tool are repeated to form a multiply part layup.

In one illustrative embodiment, a method of laying up a composite part on a tool is presented. The method comprises applying a composite prepreg over a deformable carrier; deforming the prepreg by deforming the carrier; using the carrier to apply the prepreg to the tool; and removing the carrier from the deformed prepreg. In some illustrative examples, applying the prepreg includes compacting a prepreg ply face-to-face against the carrier, and the carrier is removed from the deformed prepreg after the prepreg has been applied to the tool. In some illustrative examples, applying the prepreg includes: applying courses of unidirectional prepreg tape in side-by-side relationship on the carrier. In some illustrative examples, the method further comprises applying at least one of a release film and a ply doubler on the carrier before the prepreg is applied to the carrier; and using the carrier to apply the at least one of the release film and the doubler to the tool. In some illustrative examples, removing the carrier from the prepreg is performed after the prepreg has been applied to the tool. In some illustrative examples, the method further comprises reinforcing at least a portion of the carrier against deforming. In some illustrative examples, the method further comprises reinforcing at least a portion of the carrier against deforming wherein reinforcing a portion of the carrier includes at least one of: increasing the thickness of the carrier in the carrier portion, embossing the carrier in the carrier portion, and incorporating reinforcing fibers into the carrier portion. In some illustrative examples, deforming the carrier is performed as the prepreg is being applied to the tool.

In another illustrative embodiment, a method of changing the grade of unidirectional prepreg fibers, is presented. The method comprises adhering the unidirectional pre preg fibers to a deformable carrier film; and increasing the spacing between the prepreg fibers by deforming the film in a direction transverse to the direction of the fibers.

In yet another illustrative embodiment, a method of laying up composite prepreg over a contoured tool is presented. The method comprises placing prepreg material on a carrier film; and using the carrier film to apply the prepreg material to the tool, including deforming the prepreg material by deforming the film. In some illustrative examples, placing the prepreg material on the carrier film includes: laying down courses of unidirectional prepreg fiber tape in side-by-side relationship on the carrier film, and compacting the courses against the carrier film. In some illustrative examples, the method further comprises removing the carrier film from the prepreg material after the prepreg material has been applied to the tool. In some illustrative examples, adhering the prepreg material to the carrier film includes compacting the prepreg material against the carrier film. In some illustrative examples, carrier film is deformed to conform the prepreg material to contours on the tool. In some illustrative examples, the method further comprises reinforcing at least a portion of the carrier film against deforming. In some illustrative examples, the method further comprises reinforcing at least a portion of the carrier film against deforming and reinforcing at least a portion of the carrier film includes one of: increasing the thickness of the carrier film in the carrier film portion, embossing the carrier film in the carrier film portion, and incorporating reinforcing fibers into the carrier film portion. In some illustrative examples, the method further comprises applying at least one of a release film and a ply doubler on the tool by applying the at least one of the release film and the doubler to the carrier film and using the carrier film to place the at least one of the release film and the doubler on the tool. In some illustrative examples, the steps of placing prepreg material on a carrier film and using the carrier film to apply the prepreg material to the tool are repeated to form a multiply part layup.

In yet another illustrative embodiment, a method of deforming a prepreg fiber ply is presented. The method comprises laying up a unidirectional prepreg fiber ply on a film; and deforming film with the ply thereon. In some illustrative examples, deforming the film includes stretching the film in a direction traverse to the orientation of the fibers in the ply. In some illustrative examples, the method further comprises restraining at least a portion of the film against deformation. In some illustrative examples, the method further comprises restraining at least a portion of the film against deformation and wherein restraining at least a portion of the film against deformation is perform by reinforcing the portion of the film.

In a yet further illustrative embodiment, a method of laying up a multi-ply composite part on a tool having contoured surfaces to which the layup is to conform is presented. The method comprises providing a deformable carrier film; reinforcing a portion of the carrier film against deforming, including impregnating the carrier film portion with reinforcing fibers; placing a composite doubler on a surface of the carrier film; placing a strip of release film on the surface of the carrier film; placing a composite ply on the surface of the carrier film overlying the doubler and the strip of release film; including laying down a plurality of courses of unidirectional prepreg fiber tape in side-by-side relationship on the carrier film surface; compacting the ply, the doubler and the strip of release film against the carrier film; using the carrier film to transport the ply to a layup tool; using the carrier film to layup the doubler, the strip of release film and the ply on the tool, including deforming the ply by deforming the carrier film to cause the ply to conform to contoured areas of the tool; and peeling away the carrier film from the ply when the ply has been laid up and conformed to the tool.

A disclosed method includes laying up a zero degree ply on a deformable carrier film in a substantially rectilinear or straight direction. The zero degree ply may comprise multiple widths of a prepreg tape or a single width of the tape arranged in different layers, or in spaced apart segments. The ply segments may be staggered and then overlapped in a subsequent forming operation to create a desired ply length.

According to one disclosed embodiment, a method is provided of laying up a composite part on a tool. The method comprises providing a length of a composite resin tape reinforced with unidirectional fibers having a substantially zero degree fiber orientation and placing the tape on a deformable carrier. The method further comprises forming the tape and the carrier onto a first curved surface of a forming tool, and then forming the tape and the carrier about a curved axis onto a second curved surface on the forming tool. The method also includes removing the carrier from the formed prepreg tape. Placing the tape on the carrier may include placing the tape into face-to-face contact with the carrier and compacting the tape against the carrier. The method may further comprise contouring at least one edge of the tape along its length. The tape may be formed onto the second curved surface of the tool by deforming the carrier during the forming process.

According to another disclosed embodiment, a method is provided of fabricating a curved composite structure having at least two curved legs. The method comprises providing a length of a composite prepreg tape having unidirectional reinforcing fibers with a substantially zero degree fiber orientation. The method further comprises adhering the tape to a film and forming a first leg of the structure by forming the film and a first portion of the width of the tape over a first curved surface of a forming tool. The method further comprises forming a second leg of the structure by forming the film and a second portion of the width of the tape onto a second curved surface of the forming tool. The method also includes removing the film from the formed tape and curing the formed prepreg tape. The method may further comprise cutting the length of the composite prepreg tape into segments and adhering the tape to the film may include spacing the segments apart from each other along the length of the film.

According to still another embodiment, a method is provided of fabricating a composite stiffener having a curved web and at least one curved flange. The method comprises laying up a straight length of unidirectional prepreg tape on a carrier. The method further comprises forming the flange by using the carrier to steer a first portion of the tape onto first curved tool surface, and forming the web by using the carrier to form a second portion of the tape onto a second curved tool surface. The method further includes removing the carrier from the formed tape, and curing the formed ply.

According to a further embodiment, a method is provided of laying up a multi-ply composite part on a tool having contoured surfaces. The method includes providing a deformable carrier film and reinforcing a portion of the carrier film against deforming, including impregnating the carrier film portion with reinforcing fibers. The method also includes placing a composite doubler on a surface of the carrier film, and placing a strip of release film on the surface of the carrier film. A composite ply is placed on the surface of the carrier film overlying the doubler and the strip of release film. The method further includes laying down a plurality of courses of unidirectional prepreg fiber tape in side-by-side relationship on the carrier film surface;

In another illustrative embodiment, a method of laying up a composite part on a tool is presented. The method comprises providing a length of a composite resin tape reinforced with unidirectional fibers have a substantially zero degree fiber orientation; placing the tape on a deformable carrier; forming the tape and the carrier onto a first curved surface on a forming tool; forming the tape and the carrier about a curved axis onto a second curved surface on the forming tool; and removing the carrier from the formed prepreg tape. In some illustrative examples, placing the tape on the carrier includes compacting the tape against the carrier. In some illustrative examples, the method further comprises contouring at least one edge of the tape along its length. In some illustrative examples, the method further comprises contouring at least one edge of the tape along its length, wherein contouring the edge of the tape is performed by cutting the tape along the edge. In some illustrative examples, forming the tape and the carrier includes deforming the carrier. In some illustrative examples, forming the tape and the carrier includes deforming the carrier, wherein deforming the carrier is performed as the tape and the carrier are being formed onto the second surface of the tool.

In yet another illustrative embodiment, a method of fabricating a curved composite structure having at least two curved legs is presented. The method comprises providing a length of a composite prepreg tape having unidirectional reinforcing fibers with a substantially zero degree fiber orientation; adhering the tape to a film; forming a first leg of the structure by forming the film and a first portion of the width of the tape over a first curved surface of a forming tool; forming a second leg of the structure by forming the film and a second portion of the width of the tape onto a second curved surface of the forming tool; removing the film from the formed tape; and curing the formed prepreg tape. In some illustrative examples, forming the second leg is performed by pressing the film and shearing the second portion of the width of the tape about a curved bend line onto the second curved surface of the tool. In some illustrative examples, the method further comprises contouring at least one edge of the tape along its length. In some illustrative examples, forming the film onto the second curved surface of the tool includes deforming the film. In some illustrative examples, forming the film onto the second curved surface of the tool includes deforming the film and wherein contouring the edge of the tape is performed by cutting the tape along the edge. In some illustrative examples, the method further comprises cutting the length of the composite prepreg tape into segments, and adhering the tape to the film includes spacing the segments apart from each other along the length of the film.

In yet a further illustrative embodiment, a method of fabricating a composite stiffener having a curved web and at least one curved flange is presented. The method comprises placing up a substantially straight length of unidirectional prepreg tape on a carrier; forming the curved flange by using the carrier to steer a first portion of the tape onto a first curved tool surface; and forming the curved web by using the carrier to form a second portion of the tape onto a second curved tool surface. In some illustrative examples, forming the curved web includes deforming the carrier as the second portion of the tape is being formed onto the second curved tool surface. In one illustrative example, the first portion of the tape includes a first portion of the width of the tape, and the second portion of the tape includes a second portion of the width of the tape. In one illustrative example, a single width of the tape is used to form the flange and the web. In one illustrative example, forming the curved web includes shearing a portion of the width of the tape about a curved bend line onto the second tool surface. In one illustrative example, the method further comprises removing the carrier from the tape after the web and flange have been formed; and curing the formed tape. In one illustrative example, placing the tape on the carrier includes forming overlapping segments of tape on the carrier by sequentially forming offset segments of the tape on the carrier. In one illustrative example, placing the tape on the carrier includes forming overlapping segments of tape on the carrier by sequentially forming offset segments of the tape on the carrier and placing the tape on the carrier includes overlapping the segments. In one illustrative example, clamping the formed flange against the first curved tool surface, and wherein forming the curved web is performed while the formed flange is clamped against the first tool surface. In one illustrative example, the method further comprises contouring an edge of the tape along its length before the flange and web are formed.

In yet another illustrative embodiment, a method of laying up a multi-ply composite part on a tool having contoured surfaces to which the layup is to conform is presented. The method comprises providing a deformable carrier film; reinforcing a portion of the carrier film against deforming, including impregnating the carrier film portion with reinforcing fibers; placing a composite doubler on a surface of the carrier film; placing a strip of release film on the surface of the carrier film; placing a zero degree prepreg ply on the surface of the carrier film overlying the doubler and the strip of release film; including laying down a plurality of courses of unidirectional prepreg fiber tape in side-by-side relationship on the carrier film surface; compacting the ply, the doubler and the strip of release film against the carrier film; using the carrier film to transport the ply to a layup tool; using the carrier film to layup the doubler, the strip of release film and the ply on the tool, including deforming the ply by deforming the carrier film to cause the ply to conform to contoured areas of the tool; and removing the carrier film from the ply when the ply has been laid up and conformed to the tool.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method comprising:
    identifying a desired shape of a ply on a tool, in which the ply has a fiber orientation;
    identifying a cut shape for the ply, in which the cut shape is different than the desired shape;
    cutting a composite prepreg ply to have the cut shape, the composite prepreg ply having the fiber orientation;
    applying the composite prepreg ply having the cut shape over a deformable carrier;
    deforming the composite prepreg by stretching the deformable carrier, stretching comprising changing one of a length or a width of the deformable carrier; and
    using deformable carrier to apply the composite prepreg ply having the cut shape to the tool such that the composite prepreg ply has the desired shape on the tool.

2. The method of claim 1, further comprising:
    using the carrier to transport and locate the composite prepreg ply over a tool.

3. The method of claim 2, further comprising:
    removing the carrier from the composite prepreg ply.

4. The method of claim 2, wherein:
    applying the composite prepreg ply over the carrier includes compacting the composite prepreg ply against the carrier; and
    the carrier is removed from the composite prepreg ply after the composite prepreg ply has been applied to the tool.

5. The method of claim 2, further comprising:
    applying at least one of a release film and a ply doubler on the carrier before the composite prepreg ply is applied to the carrier.

6. The method of claim 2, wherein applying the composite prepreg ply over the carrier includes:
    laying down courses of unidirectional prepreg fiber tape in side-by-side relationship on the carrier; and
    compacting the courses against the carrier.

7. The method of claim 1, wherein the fiber orientation is a 45 degree orientation.

8. The method of claim 1, wherein the fiber orientation is a 0 degree orientation.

9. The method of claim 1 further comprising:
    deforming the composite prepreg ply by stretching the carrier, stretching comprising changing one of a length or a width of carrier.

10. The method of claim 9, wherein stretching the carrier is performed as the composite prepreg ply is being applied to the tool.

11. The method of claim 9, wherein the carrier comprises an elastic material that returns substantially to its original size and shape following stretching.

12. The method of claim 1, wherein the cut shape compensates for a shearing effect in the composite prepreg ply while applying the composite prepreg ply to the tool.

13. The method of claim 1, wherein the cut shape compensates for a fanning effect in the composite prepreg ply.

14. A method comprising:
    identifying a desired shape of a ply on a tool, in which the ply has a fiber orientation;
    identifying a cut shape for the ply, in which the cut shape is different than the desired shape;
    cutting a composite prepreg ply to have the cut shape, the composite prepreg ply having the fiber orientation;
    placing the composite prepreg ply having the cut shape on a carrier; and
    using the carrier to apply the composite prepreg ply to the tool, including deforming the composite prepreg ply by stretching the carrier, stretching comprising changing one of a length or a width of the carrier.

15. The method of claim 14, wherein placing the composite prepreg ply on a carrier film comprising:
    laying down courses of unidirectional prepreg fiber tape in side-by-side relationship on the carrier; and
    compacting the courses against the carrier.

16. The method of claim 14, wherein placing composite prepreg plies on the carrier and using the carrier to apply the composite prepreg plies are repeated to form a multiple ply part layup.

17. The method of claim 14, wherein deforming the composite prepreg ply includes:
    stretching the carrier in a direction transverse to the fiber orientation of the composite prepreg ply.

* * * * *

UNITED STATES PATENT AND TRADEMARK OFFICE
CERTIFICATE OF CORRECTION

PATENT NO. : 9,701,067 B2
APPLICATION NO. : 14/048009
DATED : July 11, 2017
INVENTOR(S) : Hawkins et al.

It is certified that error appears in the above-identified patent and that said Letters Patent is hereby corrected as shown below:

In the Claims

Column 21, Line 56, change "prepreg by" to -- prepreg ply by --
Column 21, Line 59, change "using deformable carrier" to -- using the deformable carrier --
Column 21, Line 64, change "a tool" to -- the tool --
Column 22, Line 17, change "in side-by-side" to -- in a side-by-side --
Column 22, Line 52, change "on a carrier film comprising" to -- on the carrier comprising --

Signed and Sealed this
Sixth Day of November, 2018

Andrei Iancu
*Director of the United States Patent and Trademark Office*